US012651254B2

(12) United States Patent
Manka et al.

(10) Patent No.: US 12,651,254 B2
(45) Date of Patent: Jun. 9, 2026

(54) MULTI-TOKEN PROVISIONING, ONLINE PURCHASE TRANSACTION PROCESSING, AND CARD LIFE CYCLE MANAGEMENT SYSTEMS AND METHODS

(71) Applicant: Capital One Financial Corporation, McLean, VA (US)

(72) Inventors: Bryan L. Manka, Spring, TX (US); George Danforth, Tomball, TX (US)

(73) Assignee: Capital One Financial Corporation, McLean, VA (US)

( * ) Notice: Subject to any disclaimer, the term of this patent is extended or adjusted under 35 U.S.C. 154(b) by 0 days.

(21) Appl. No.: 18/680,700

(22) Filed: May 31, 2024

(65) Prior Publication Data
US 2024/0320665 A1 Sep. 26, 2024

Related U.S. Application Data

(63) Continuation of application No. 18/092,406, filed on Jan. 2, 2023, now abandoned, which is a continuation
(Continued)

(51) Int. Cl.
*G06Q 20/26* (2012.01)
*G06Q 20/38* (2012.01)
(Continued)

(52) U.S. Cl.
CPC ......... *G06Q 20/3829* (2013.01); *G06Q 20/26* (2013.01); *G06Q 20/3823* (2013.01);
(Continued)

(58) Field of Classification Search
CPC ............... H04L 63/062; G06Q 20/385; G06Q 20/3829; G06Q 20/3823; G06Q 20/409; G06Q 20/26
See application file for complete search history.

(56) References Cited

U.S. PATENT DOCUMENTS 8,768,838 B1 7/2014 Hoffman
10,454,779 B2 10/2019 Narasimhan et al.
(Continued)

FOREIGN PATENT DOCUMENTS

GB 2370475 A * 6/2002 ......... H04L 63/0807

OTHER PUBLICATIONS

Daniel., An Efficient Forward Secure Authenticated Encryption Scheme with Ciphertext Authentication Based on Two Hard Problems, Advances in Big Data and Cloud Computing, 2018, vol. 645, p. 123-133.*

*Primary Examiner* — Ilse I Immanuel
(74) *Attorney, Agent, or Firm* — Lee Sullivan Shea & Smith LLP

(57) ABSTRACT

Systems, methods, and software are disclosed for provisioning tokens in a networked computing environment including merchants participating in payment networks. The method includes receiving, by a merchant processor, card account data of a purchase card from a cardholder. The method includes determining, by the merchant processor, that the card account data includes a multi-token enabled BIN. The method includes, in response to determining that the card account data includes the multi-token enabled BIN, receiving and storing, by the merchant processor and in a memory of the merchant, respectively, a primary token associated with a front-of-card brand of the purchase card. The method includes, in response to receiving the primary token, transmitting, by the merchant processor, a request for a secondary token. The method includes receiving and storing, by the merchant processor and in the merchant memory, respectively, the secondary token simultaneously with storing the primary token.

9 Claims, 12 Drawing Sheets

Related U.S. Application Data of application No. 16/396,323, filed on Apr. 26, 2019, now Pat. No. 11,544,706.

(51) Int. Cl.
  *G06Q 20/40*          (2012.01)
  *H04L 9/40*           (2022.01)
(52) U.S. Cl.
  CPC ......... *G06Q 20/385* (2013.01); *G06Q 20/409* (2013.01); *H04L 63/062* (2013.01)

(56)                References Cited

U.S. PATENT DOCUMENTS

| | | | |
|---|---|---|---|
| 2008/0189214 | A1 | 8/2008 | Mueller et al. |
| 2009/0048953 | A1 | 2/2009 | Hazel et al. |
| 2010/0051685 | A1 | 3/2010 | Royyuru et al. |
| 2011/0071892 | A1 | 3/2011 | Dickelman |
| 2012/0259782 | A1 | 10/2012 | Hammad |
| 2013/0103577 | A1 | 4/2013 | Lawson et al. |
| 2013/0275245 | A1 | 10/2013 | Dixon et al. |
| 2014/0158759 | A1 | 6/2014 | Smets et al. |
| 2015/0032627 | A1 | 1/2015 | Dill et al. |
| 2015/0039517 | A1 | 2/2015 | Liberty et al. |
| 2015/0095367 | A1 | 4/2015 | Mattsson et al. |
| 2015/0112871 | A1 | 4/2015 | Kumnick |
| 2015/0199679 | A1 | 7/2015 | Palanisamy et al. |
| 2015/0242853 | A1 | 8/2015 | Powell |
| 2015/0379508 | A1 | 12/2015 | Van |
| 2016/0110709 | A1* | 4/2016 | Lacoss-Arnold ........................... G06Q 20/3821 705/75 |
| 2016/0239833 | A1 | 8/2016 | Venugopalan et al. |
| 2016/0351200 | A1 | 12/2016 | Sung et al. |
| 2017/0161733 | A1 | 6/2017 | Koletsky et al. |
| 2017/0295155 | A1* | 10/2017 | Wong ................... H04L 67/306 |
| 2018/0068293 | A1 | 3/2018 | Dunne |
| 2018/0075081 | A1* | 3/2018 | Chipman ............. G06F 16/955 |

* cited by examiner

240

603

MULTI-TOKEN PROVISIONING, ONLINE PURCHASE TRANSACTION PROCESSING, AND CARD LIFE CYCLE MANAGEMENT SYSTEMS AND METHODS

CROSS-REFERENCE TO RELATED APPLICATIONS

This application claims priority to, and is a continuation of, U.S. application Ser. No. 18/092,406, filed on Jan. 2, 2023, and entitled "Multi-Token Provisioning, Online Purchase Transaction Processing, and Card Life Cycle Management Systems and Methods," which is a continuation of U.S. application Ser. No. 16/396,323, filed on Apr. 26, 2019, and entitled "Multi-Token Provisioning, Online Purchase Transaction Processing, and Card Life Cycle Management Systems and Methods," the contents of each of which are incorporated by reference herein in their entirety.

BACKGROUND

Merchants processing purchase card transactions, including in online shopping contexts, are charged processing and/or service fees to realize payment for such transactions. Naturally, merchants have a business interest and desire to not only minimize such transactions costs, but also to establish processes that make those costs more predictable. Commentators have called for more transparency and standardization regarding interchange and the cost associated with processing bankcards. The Durbin Amendment to the Dodd-Frank Wall Street Reform and Consumer Protection Act of 2010 was intended to address this issue for businesses and inure to the benefit of both merchants and consumers. Among the pro-competitive policies the Durbin Amendment facilitated are capped interchange fees charged to merchants every time they processed debit card transactions.

In e-commerce contexts, for example, merchants may obtain and store network-based tokens to facilitate payments in place of storing actual card numbers. In at least some known market contexts, merchants have to pay a different fee based on the bank that issued the debit card. The primary token obtained from token service platform(s) of global front-of-card brands (e.g., Visa®) may contain processing restrictions that may prevent merchants from using a primary token to route a payment transaction to an alternate network (e.g., Pulse®) that may be enabled on the actual card. The commercial framework for secondary tokens is based on transactional and other service fees. In at least some known business contexts, merchants are unable to effectively and efficiently establish purchase or payment transaction routing preferences on a per transaction basis, so as to predict, plan for, and minimize transaction costs, and maximize net profits. It would thus be beneficial to both merchants and consumers at large to provide a means for preserving merchant routing choice when no other alternative exists in the market today.

SUMMARY

The disclosed systems, methods, and associated software enable merchants to maximize their savings and establish processes to optimize payment processing to benefit both their operations and their customers' experiences. Merchants are thereby enabled to have co-resident tokens tied to a single customer payment account and use those secondary tokens to have the choice that they should have under the Durbin Amendment, but currently do not. Merchants are enabled to obtain a token that is not restricted to route to the global payment network and to route a tokenized stored credential transaction to any network enabled to support an alternative (e.g., secondary) token. In addition, the disclosed systems, methods, and software provide a framework for standardization and/or regulatory compliance of payment processing in market contexts involving both front-of-card brands and back-of-card brands attached to the same purchase card being used in respective transactions.

With the systems, methods, and software disclosed herein, merchants can, after obtaining a primary token from systems associated with the front-of-card brand, obtain a secondary token from a secondary token service provider than can be used to route transactions to the alternate network (e.g., Pulse®) with the expectation that authorization requests can be processed successfully. As such, the disclosed systems, methods, and software provide merchants routing choice for tokenized card-on-file (COF) transactions by enabling secondary tokens to be stored and otherwise maintained/managed side-by-side with primary, front-of-card, tokens. Furthermore, life cycle management (LCM) processes provided by the disclosed systems, methods, and software enable the side-by-side tokens to be always synchronized in merchant systems.

The below-described systems, methods, and software enable networks to compete for merchant transactions and gives merchants greater control of routing decisions. Experiences of merchant customers (e.g., registration of profile on e-commerce websites and/or online checkout processes) are not, or are only negligibly, affected. Meanwhile, merchants may pass cost savings of practicing the disclosed systems, methods, and software to the customers.

With the side-by-side tokens provided by the disclosed systems, methods, and software, merchants have: a primary token, assigned by the front-of-card brand that may be subject to routing restrictions; and an alternate (secondary) token that provides routing support to participating alternate (e.g., debit) payment networks. The general process flow of the disclosed systems, methods, and software includes: a) cardholder adds primary account number (PAN) to profile; b) merchant identifies tokenized COF-enabled networks via bank identification number (BIN) file inquiry; c) merchant requests and obtains a token from a supported token service provider; d) merchant adds tokenized payment credentials to cardholder profile; and e) merchants have the security of tokens and the power of choice.

To practice the disclosed systems, methods, and software, merchant requirements are such that established systems may be utilized and additional investment in hardware and infrastructure is not necessary, or is, at most, negligible. The disclosed systems, methods, and software are integrated into existing systems and networks and are readily adaptable to present and future hard and network infrastructures. In practice, merchants' operations impacted minimally as compared to present business practices. For example, the disclosed systems, methods, and software require merchants to: (i) request and store multiple tokens for each actual debit PAN; (ii) enable token selection based on preferred network route; (iii) directly or indirectly (e.g., via a service provider) access network BIN files to determine secondary network token support and provider.

In practicing the disclosed systems, methods, and software, merchants may integrate, for example, with Discover®'s token service platform (e.g., DDX®). In such cases, the set up for merchants includes: (A) identifying eligible BINS during card enrollment (e.g., via BIN files); (B) establishing token request and lifecycle management processes; (C) determining network routing preferences; and (D) enabling payment system to route according to preferences.

In operation of some embodiments of the disclosed systems, methods, and software, merchant customers/cardholders provide their personal and account data to merchant e-commerce website interfaces as usual. Customers see their masked actual PAN, and have no awareness of tokens. The merchants' databases see a customer's actual PAN name, a unique token PAN, network routes (e.g., Visa®), and token type (e.g., primary for Visa®). Additionally, with the disclosed systems, methods, and software, the merchant database sees another (e.g., a second) unique token PAN for the respective actual PAN name, and for another (e.g., a second) network route (e.g., Pulse®), with an associated (e.g., alternate) token type for the second unique token PAN.

In a first aspect of the disclosure, a method for provisioning tokens is provided. The method may be implemented in a networked computing environment including merchants participating in payment networks. The method includes receiving, by a merchant processor, card account data of a purchase card from a cardholder. The method includes determining, by the merchant processor, that the card account data includes a multi-token enabled BIN. The method includes, in response to determining that the card account data includes the multi-token enabled BIN, receiving and storing, by the merchant processor and in a merchant memory, respectively, a primary token associated with a front-of-card brand of the purchase card. The method includes, in response to receiving the primary token, transmitting, by the merchant processor, a request for a secondary token. The method includes receiving and storing, by the merchant processor and in the merchant memory, respectively, the secondary token simultaneously with storing the primary token.

In an embodiment, the receiving and storing step of the method of the first aspect may include receiving and storing the primary token from a primary token service provider (TSP). In any of the above embodiments of the method of the first aspect, the transmitting may include transmitting the request for the secondary token to a secondary TSP processor of a secondary TSP associated with a back-of-card brand of the purchase card.

In any of the above embodiments of the method of the first aspect, the method may include generating and transmitting, by the secondary TSP processor, the secondary token to the merchant processor in response to receiving the request for the secondary token from the merchant processor. In any of the above embodiments of the method of the first aspect, the method may include transmitting, by the secondary TSP processor and in response to receiving the request for the secondary token from the merchant processor, a card account data verification request for verification by a card issuer.

In any of the above embodiments of the method of the first aspect, the method may include receiving, by the secondary TSP processor, a verification message indicating that the card account data is verified. In any of the above embodiments of the method of the first aspect, the step of generating and transmitting the secondary token may include generating and transmitting the secondary token in response to receiving the verification message.

In any of the above embodiments of the method of the first aspect, the purchase card may be a debit card. In any of the above embodiments of the method, the primary TSP may be associated with a payment network for the front-of-card brand. In any of the above embodiments of the method of the first aspect, the secondary TSP may be associated with a payment network for the back-of-card brand. In any of the above embodiments of the method of the first aspect, the secondary TSP may be associated with a debit network for the back-of-card brand.

In a second aspect of the disclosure, a method for processing purchase transactions is provided. The method may be implemented in a networked computing environment including merchants participating in payment networks. The method includes receiving, by a merchant processor, a purchase or payment request from a cardholder, where card account data of a purchase card of the cardholder is simultaneously stored in a merchant memory as: (i) a primary token for a front-of-card brand of the purchase card; and (ii) a secondary token for a back-of-card brand of the purchase card. The method includes, in response to receiving the purchase or payment request, building, by the merchant processor, a network route list based on merchant-defined predetermined network routing preferences. The method includes, for the predetermined network routing preferences indicating a preference for completing the purchase or payment transaction using the secondary token: (a) selecting, by the merchant processor, the secondary token for the purchase or payment request; (b) transmitting, by the merchant processor, an authorization request to a payment network associated with the secondary token; and (c) receiving, by the merchant processor a purchase or payment request confirmation.

In an embodiment, for the predetermined network routing preferences indicating the preference for completing the purchase or payment transaction using the secondary token, the method of the second aspect may include, before receiving the purchase or payment request confirmation and after transmitting the authorization request to the payment network: (i) detokenizing, by the payment network associated with the secondary token; (ii) transmitting, by the payment network associated with the secondary token, a rebuilt purchase or payment transaction authorization request to an issuer of the purchase card; and (iii) receiving, by the payment network associated with the secondary token, a purchase or payment transaction authorization acknowledgement from the issuer.

In any of the above embodiments of the method of the second aspect, the method may include, in response to receiving the purchase or payment transaction authorization acknowledgment, transmitting, by the payment network associated with the secondary token, the purchase or payment request confirmation to the merchant processor. In any of the above embodiments of the method of the second aspect, for the predetermined network routing preferences indicating the preference for completing the purchase or payment transaction using the primary token, the method may include: (A) selecting, by the merchant processor, the primary token for the purchase or payment request; (B) transmitting, by the merchant processor, an authorization request to a payment network associated with the primary token; and (C) receiving, by the merchant processor, a purchase or payment confirmation from the payment network associated with the primary token indicating that the purchase or payment transaction for the primary token is authorized by an issuer of the purchase card.

In any of the above embodiments of the method of the second aspect, the payment network associated with the primary token may be associated with a payment network for the front-of-card brand. In any of the above embodiments of the method of the second aspect, the purchase card may be a multi-token enabled purchase card. In any of the above embodiments of the method of the second aspect, the purchase card may be a debit card. In any of the above embodiments of the method of the second aspect, the payment network associated with the secondary token may be associated with a payment network for the back-of-card brand. In any of the above embodiments of the method of the second aspect, the payment network associated with the secondary token may be associated with a debit network for the back-of-card brand In a third aspect of the disclosure, a method for automatically updating tokenized customer purchase card account data is provided. The method may be implemented in a networked computing environment including merchants participating in payment networks. The method includes receiving, by a merchant processor, a life cycle management (LCM) advice for purchase card account data of a cardholder from a network entity having custodial authority over the purchase card account data. The method includes, in response to receiving the LCM advice, deleting or suspending, by the merchant processor, simultaneously stored tokens associated with the purchase card account data of the cardholder from a merchant memory, where the tokens include: (i) a primary token for a front-of-card brand of a purchase card; and (ii) a secondary token for a back-of-card brand of the purchase card. The method includes updating, by the merchant processor, a customer profile of the cardholder stored as data in the merchant memory.

In an embodiment of the method of the third aspect, the step of deleting or suspending the simultaneously stored tokens may include: (a) deleting, by the merchant processor, the primary token from the merchant memory; (b) in response to deleting the primary token, transmitting, by the merchant processor, an LCM request to a secondary token service provider (TSP) processor of a secondary TSP associated with the secondary token; (c) receiving, by the merchant processor, an LCM response from the secondary TSP processor; and (d) deleting, by the merchant processor, the secondary token from the merchant memory. In any of the above embodiments of the method of the third aspect, the network entity may be the cardholder, and step of receiving the LCM advice may include receiving a request from the cardholder to delete or update the purchase card account data in the customer profile. In any of the above embodiments of the method of the third aspect, the network entity may be an issuer of the purchase card, and the step of receiving the LCM advice may include receiving a notification of a cardholder account closure or suspension from the issuer.

In any of the above embodiments of the method of the third aspect, the method may include deleting, by the merchant processor, the purchase card account data from the customer profile.

In any of the above embodiments of the method of the third aspect, the secondary TSP may be associated with a payment network for the back-of-card brand. In any of the above embodiments of the method of the third aspect, the secondary TSP may be associated with a debit network for the back-of-card brand. In any of the above embodiments of the method of the third aspect, the purchase card may be a debit card. In any of the above embodiments of the method of the third aspect, the purchase card may be a multi-token enabled purchase card.

Among other benefits and commercial and technical advantages provided by the disclosed systems, methods, and software, distinguishing primary and alternate token types in the merchant database of token PANs associated with actual PAN names enables merchants to select the network they want to route to and utilize the corresponding token for each transaction. Additionally, the disclosed systems, methods, and software enable the back-of-card brand (e.g., Pulse®) to compete for transactions that would not otherwise be feasibly or profitably supported due to global payment network token use restrictions. The disclosed systems, methods, and software also provide a mechanism for merchants to both participate in network-based token solutions and maintain routing choice. The disclosed systems, methods, and software further enable merchants, cardholders and issuers to benefit from higher authorization rates related to token utilization. Additional and related technical and business benefits and technical effects shall be readily ascertained by persons having ordinary skill in the art upon reading of the detailed descriptions and with reference to the attached drawings and the appended claims.

BRIEF DESCRIPTION OF DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
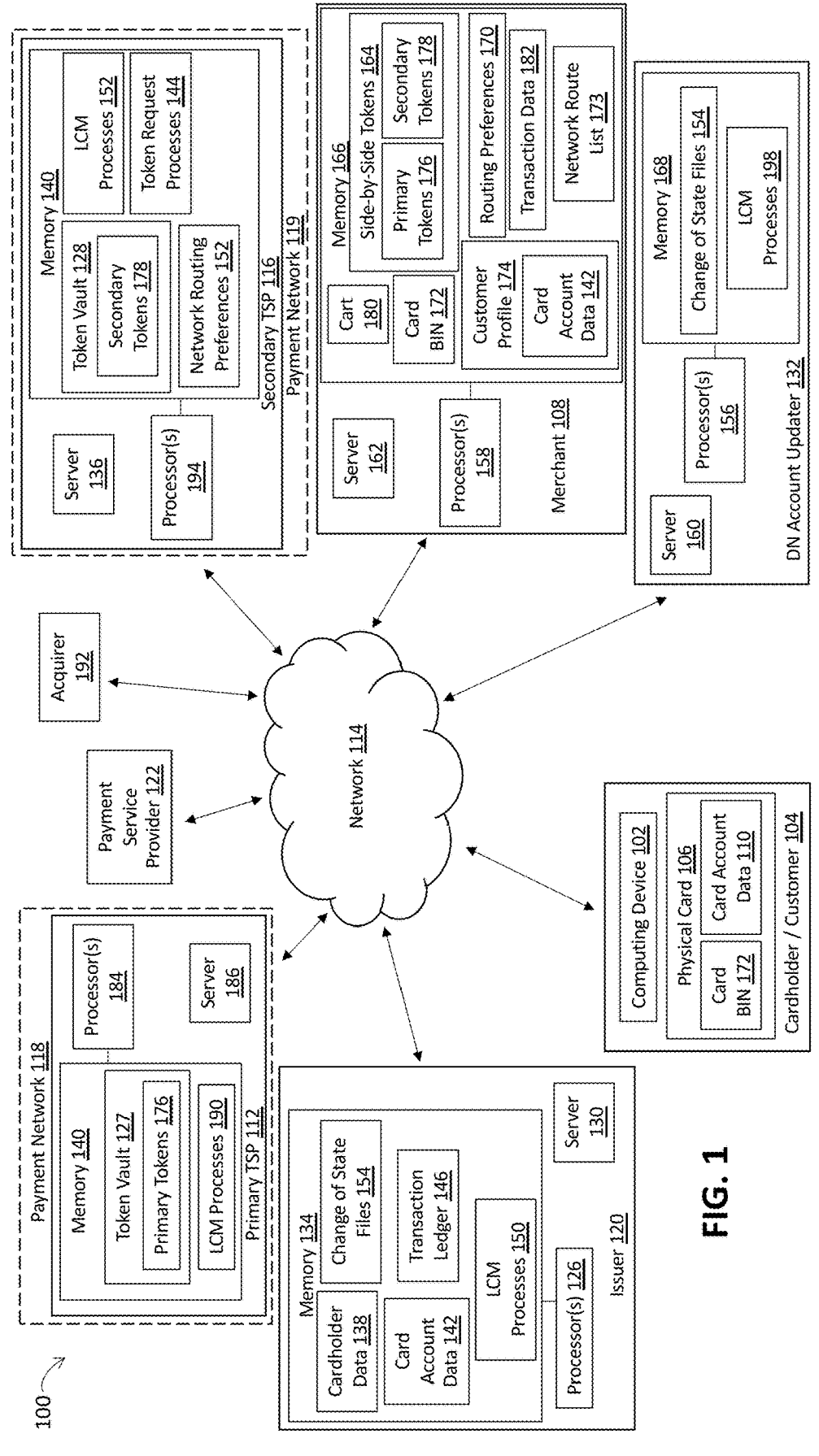
FIG. 1 is a schematic diagram of a networked computing environment for provisioning tokens, processing purchase or payment transactions, and/or automatically updating tokenized purchase card account data of customers of online merchants participating in payment networks, according to an embodiment of the disclosure.

FIG. 1 is a schematic diagram of a networked computing environment (100) for provisioning tokens, processing purchase or payment transactions, and/or automatically updating tokenized purchase card account data (142) of customers (104) of online merchants (108) participating in payment (e.g., debit) networks, according to an embodiment of the disclosure. Networked computing environment (100) includes a plurality of network entities, including a cardholder (104). Cardholder (104) has possession and/or control (e.g., custodial control) over a purchase card (106) (e.g., a debit, credit, gift, or stored value card) and its associated purchase card (106) account data (110). In an example, cardholder (104) uses a computing device (102) to communicate and otherwise interact with a website of an online merchant (108), including to perform online shopping and make online purchases of goods and/or services offered by, or to otherwise make payments to, merchant (108). The physical card (106) includes card account data (110) including a card number, an expiration date, and a card verification value (CVV) number. Online shopping by cardholder (104) using purchase card (106) enables the cardholder/customer (104) to initiate and complete online purchase transactions at online merchant(s) (108) without having to present the physical card (106). Cardholder (104) may similarly initiate any other payments to merchant (108) besides for online shopping and/or non-e-commerce contexts, including, without limitation, cardholder (104) pre-authorized payments initiated by merchant (108) on behalf of cardholder (104) (e.g., installment and/or recurring payments). Purchase card (106) includes a Bank Identification Number (BIN) (172). In an example, the BIN represents the first 6 to 8 digits of the card number. In another example, the BIN is at least 1 digit long, but less than 6 digits long. In yet another example, the BIN is longer than 8 digits long, but less than the total number of digits of the card number. In an example, the purchase card (106) is a multi-BIN enabled purchase card (106).

The networked entities in networked computing environment (100) include one or more merchants (108). In an example, merchants (108) are e-commerce merchants that maintain websites on the World Wide Web (WWW) for offering goods and/or services for sale to cardholders (104). In another example, merchants (108) are engaged in both e-commerce and non-ecommerce transactions (e.g., a retail store having an e-commerce website in addition to "brick and mortar" store(s)). In yet another example, merchants (108) receive installment and/or recurring payments (e.g., health club memberships where the merchant stores purchase card information one file, but is not necessarily an online e-commerce merchant). To these ends, merchant (108) utilizes one or more computing and communication devices. These merchant (108) systems include one or more merchant processors (158) in communication with at least one merchant memory device (collectively referred to herein as "merchant memory (166)"). In an example, merchant (108) includes one or more servers (162) which implement and/or otherwise perform, at least in part, the functionality of merchant processor (158) and/or merchant memory (166).

Among other purposes directed to commerce operations, merchant memory (166) stores, as data, a customer profile (174) of the cardholder/customer (104). Cardholder (104) enters their personally-identifying information (PII) for storage in the customer profile (174) and further to the merchant's (108) commercial purpose. Merchant (108) may instead receive the information for the customer profile (174) of the cardholder/customer (104) and then store it in merchant memory (166). The PII includes the cardholder's (104) name, telephone number, and mailing address. The PII includes the cardholder's (104) purchase card (106) information, which the merchant processor (158) may encrypt prior to or during the process of storing the purchase card (106) information in the customer profile (174). Merchant (108) stores, as data, the card BIN (172) of the purchase card (106) in merchant memory (166), including, without limitation, in the customer profile (174). Merchant memory (166) stores, as data, primary (176) and secondary (178) tokens associated with the purchase card (106). In an example, merchant (108) stores, as data, the primary (176) and secondary (178) tokens simultaneously in merchant memory (166) as side-by-side tokens (164). In an example, primary (176) and/or secondary (178) tokens are created and stored during or after encryption and/or tokenization of the cardholder's (104) purchase card (106) information. In an example, the purchase card (106) is a multi-token enabled purchase card (106).

Merchant memory (166) stores, as data, transaction data (182) for purchases and/or payments (e.g., installment and/or recurring payments) of cardholder/customer (104). For instance, cardholder (104) selects goods and/or services from the offerings of merchant (108) on their c-commerce website. The selections are stored in a virtual shopping cart (180), which stores, as data, the identities of selected goods and/or services along with their quantity and unit prices and any applicable sales tax. To complete a transaction and make the purchase, cardholder (104) checks out and merchant (108) provides (e.g., mails and/or makes available for download) the goods/services after merchant (108) successfully receives payment from cardholder (104) for the online purchase.

Merchant memory (166) stores, as data, merchant (108)-defined predetermined network routing preferences (170) for purchase and/or payment transactions by cardholders (104). In an example, e-commerce transactions are routed according to the per transaction cost of processing payments. For instance, the predetermined network routing preferences (170) may specify that routing e-commerce transactions to a secondary token service provider (TSP) (116) is less expensive for merchant (108) as compared to routing e-commerce transactions to a primary TSP (112). In an example, the primary TSP (112) is associated with a payment network (118) for a front-of-card brand (e.g., Visa®) of the purchase card (106). In an example, the secondary TSP (116) is associated with a payment (e.g., debit) network (119) for a back-of-card brand (e.g., Pulse®) of the purchase card (106). Based on the predetermined network routing preferences (170), merchant processor (108) creates and stores, as data, a network route list (173) in merchant memory (166). In an example, merchant processor (108) creates and stores, as data, in merchant memory (166) network route list (173) on a per transaction basis.

The network entities of networked computing environment (100) include a card issuer (120). Issuer (120) has custodial control over account data (142) of purchase card (106) and cardholder data (138) associated with cardholder (104). In an example, issuer (120) is a bank and cardholder (104) is a banking customer of issuer (120). Issuer (120) utilizes one or more computing and communication devices. These issuer (120) systems include one or more issuer processors (126) in communication with at least one issuer memory (139). In an example, issuer (120) includes one or more servers (130) which implement and/or otherwise perform, at least in part, the functionality of issuer processor (126) and/or issuer memory (139).

Among other purposes directed to issuer (120) operations, issuer memory (139) stores, as data, the cardholder (138) and card account (142) data of the cardholder (104). Issuer (120) stores, as data, a transaction ledger (146) for the cardholder's (104) account, including, without limitation, a running list of transactions performed by cardholder (104) using purchase card (104). Issuer memory (139) stores data for life cycle management (LCM) processes (150) and change of state files (154). In an example, LCM processes (150) are used by issuer processor (126) to facilitate updating and/or otherwise changing the cardholder (138) and/or the card account (142) data stored in issuer memory (139). In an example, the change of state files (154) contain data related to a status of the purchase card (106) and or its associated account at issuer (120). In an example, for a particular issued purchase card (106), the change of state files (154) contain data representing a status of purchase card (106) and/or the associated account of cardholder (104) at issuer (120). For instance, change of state files (154) indicate the status of purchase card (106) as active, suspended, and/or closed.

The network entities of networked computing environment (100) include a payment service provider (122), an acquirer (192), and the primary TSP (112). Primary TSP (112) utilizes one or more computing and communication devices. These primary TSP (112) systems include one or more primary TSP processors (184) in communication with at least one primary TSP memory (188). In an example, primary TSP (112) includes one or more servers (186) which implement and/or otherwise perform, at least in part, the functionality of primary TSP processor (184) and/or primary TSP memory (188).

Among other purposes directed to primary TSP (112) operations, primary TSP memory (188) stores, as data, primary tokens (176) for purchase cards (110) of a plurality of cardholders (104). In an example, primary tokens (176) stored in primary TSP memory (188) include primary tokens (176) stored in merchant memory (166). In addition to storing primary tokens (176), primary TSP memory (188) may store purchase card (110) information of cardholders (104). Primary TSP memory (188) stores data for primary TSP (112) LCM processes (190). In an example, LCM processes (190) are used by primary TSP processor (126) to facilitate updating and/or otherwise changing the primary tokens (176) for associated purchase cards (110) in response to changes and/or updates in change of state files (154) stored in issuer memory (134) and/or in association with customer profiles (174) stored in merchant memory (166).

The network entities of networked computing environment (100) include the secondary TSP (116). Secondary TSP (116) utilizes one or more computing and communication devices. These secondary TSP (116) systems include one or more secondary TSP processors (194) in communication with at least one secondary TSP memory (140). In an example, secondary TSP (116) includes one or more servers (136) which implement and/or otherwise perform, at least in part, the functionality of secondary TSP processor (194) and/or secondary TSP memory (140).

Among other purposes directed to secondary TSP (116) operations, secondary TSP memory (140) stores, as data, secondary tokens (178) for purchase cards (110) of a plurality of cardholders (104). In an example, secondary TSP (116) stores the secondary tokens (178) in secondary TSP memory (140) as a token vault (128). In an example, secondary tokens (178) stored in secondary TSP memory (140) include at least one of those secondary tokens (176) stored in merchant memory (166). In addition to storing secondary tokens (178), secondary TSP memory (140) may store purchase card (110) information of cardholders (104). Secondary TSP memory (140) stores data for secondary TSP (116) LCM processes (148). In an example, LCM processes (148) are used by secondary TSP processor (194) to facilitate updating and/or otherwise changing the secondary tokens (176) for associated purchase cards (110) in response to changes and/or updates in change of state files (154) stored in issuer memory (134) and/or in association with customer profiles (174) stored in merchant memory (166).

Secondary TSP memory (140) stores, as data, token request processes (144) and network routing preferences (152). In an example, network routing preferences (152) stored in secondary TSP memory (140) include the predetermined network routing preferences (170) stored in merchant memory (166). In an example, secondary TSP processor (158) updates and/or otherwise changes token request (144) and/or network routing (152) preferences based on corresponding changes made by merchant processor (158) to the predetermined network routing preferences (170) (e.g., based on variations in per transaction routing and/or processing costs).

The network entities of networked computing environment (100) include a Discover® Network (DN) account updater (132). DN account updater (132) facilitates updating secondary tokens (178) stored in merchant memory (166). In an example, utilizing DN account updater (132) in the networked computing environment (100) supplants the need to utilize secondary TSP (116) for updating, deleting, or otherwise changing the merchant (108)-stored secondary tokens (178). DN account updater (132) utilizes one or more computing and communication devices. These DN account updater (132) systems include one or more DN account updater processors (156) in communication with at least one DN account updater memory (168). In an example, DN account updater (132) includes one or more servers (160) which implement and/or otherwise perform, at least in part, the functionality of DN account updater processor (156) and/or DN account updater memory (168).

Among other purposes directed to DN account updater (132) operations, DN account updater memory (168) stores, as data, the change of state files (154) received, from time to time, from issuer (120). DN account updater memory (168) stores data for life cycle management (LCM) processes (198) and the change of state files (154) received from issuer (120). In an example, LCM processes (198) are used by DN account updater processor (156) to facilitate updating and/or otherwise changing (e.g., suspending and/or deleting) secondary tokens (178) stored in merchant memory (166) and associated with purchase cards (106).

In an example, issuers (120) participate in PULSE® account updating using DN account updater (132, thus enabling PULSE® to maintain token/PAN mapping. In an example, merchants (108) continue to participate in account updater services of global (e.g., front-of-card) brands, either instead of, or in addition to, the DN account updater (132)-based process.

Processors of the above-described network entities of networked computing environment (100) may be located in the networked computing environment (100). Processors of the network entities may be located remote from networked computing environment (100). In another example, network computing environment (100) processors may be located both in networked computing environment (100) and remote from networked computing environment (100). Processors of the network entities may be included in one or more servers (e.g., as shown in FIG. 1) and/or other suitable network appliances and/or computing devices, including, without limitation, as part of a blockchain-based architecture. Similarly, memory devices of the above-described network entities of networked computing environment (100) may be located in the networked computing environment (100). Memory devices (304) of the network entities may be located remote from networked computing environment (100). In another example, network computing environment (100) memory devices may be located both in networked computing environment (100) and remote from networked computing environment (100). Memory devices of the network entities may be included in one or more servers (e.g., as shown in FIG. 1) and/or other suitable network appliances and/or computing devices, including, without limitation, as part of a blockchain-based architecture. In an example, processors and memory devices of network entities of networked computing environment (100) are situated, and operate, in a distributed network architecture. In another example, processors and memory devices of the disclosed network entities are situated, and operate, in a centralized network architecture. In the embodiments disclosed herein, processors of the above-described network entities are programmed, and respective memory devices are configured, to implement and/or otherwise perform, at least in part, one or more of the disclosed steps of the methods described below, including, without limitation, using networked computing environment (100).

Figure 2A:
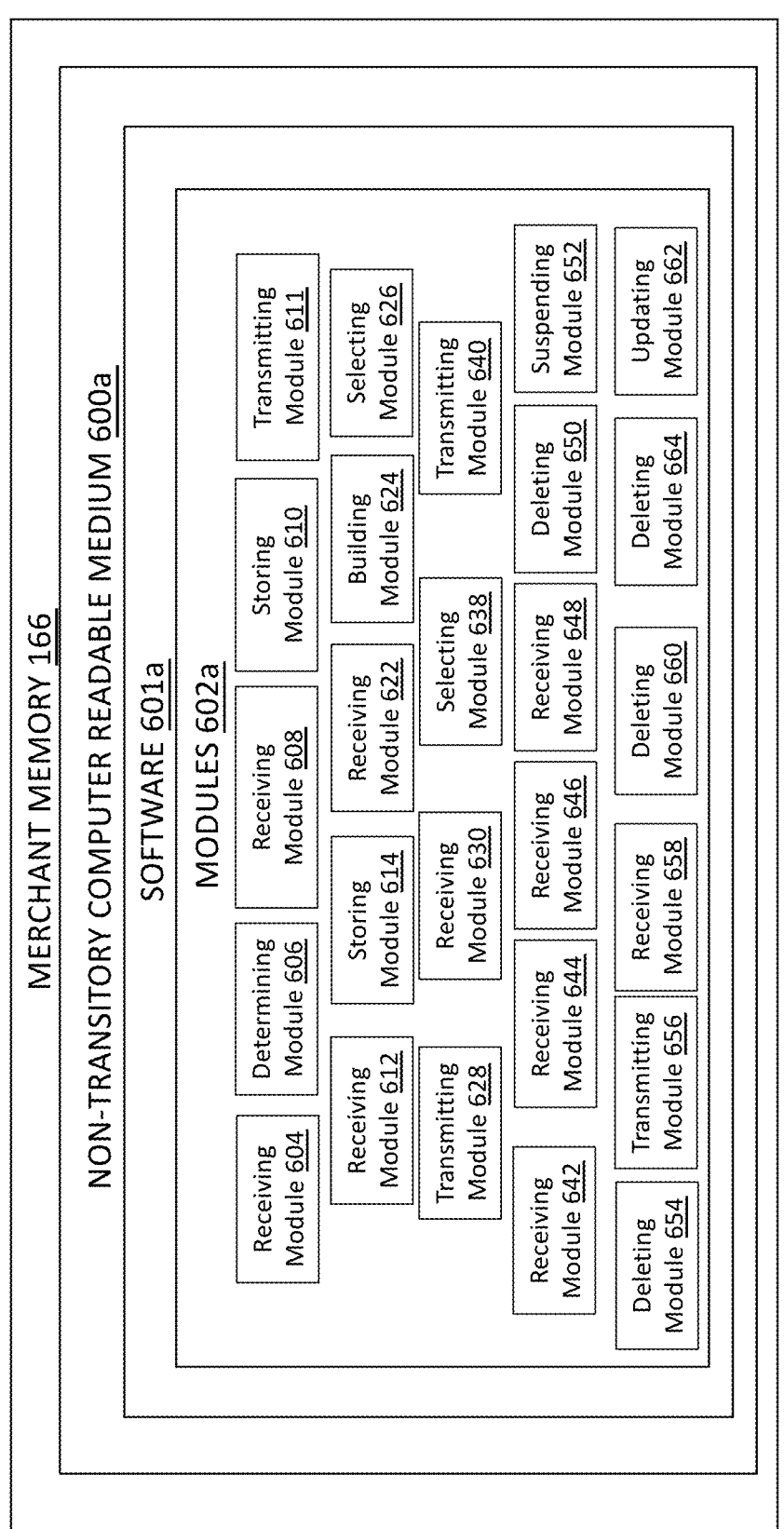
FIG. 2A is a block diagram of a software architecture for implementing and/or otherwise facilitating, at least in part, the methods of FIGS. 3, 5, and 7, and the processes of FIGS. 4, 6, 8 and 9, according to an embodiment of the disclosure.
Figure 2B:
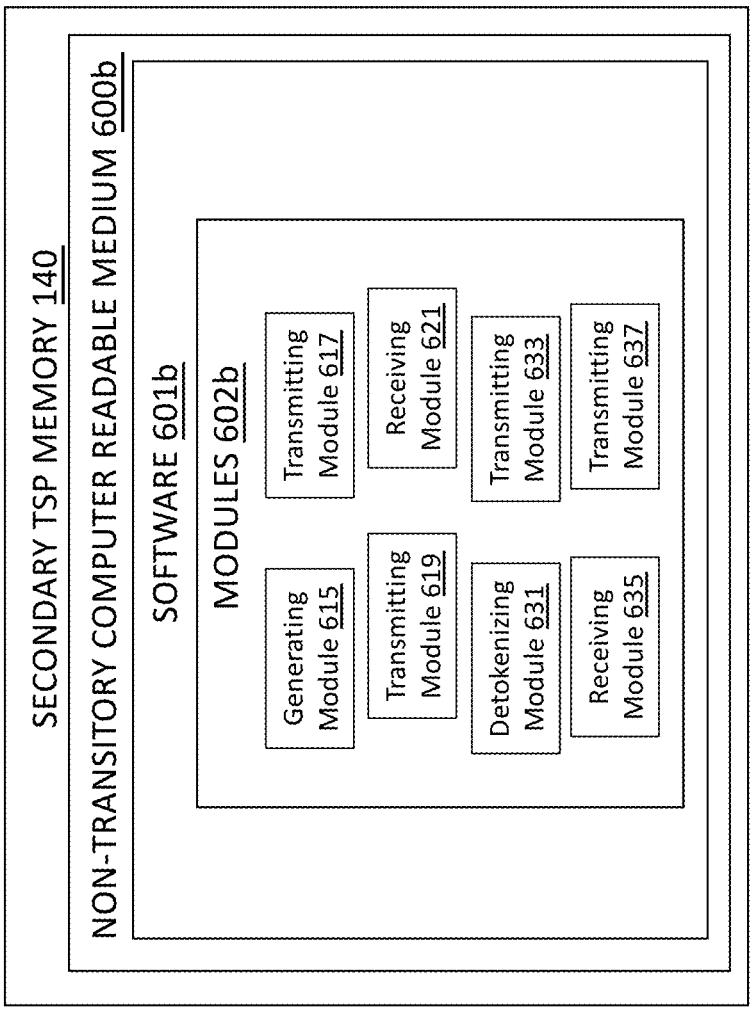
FIG. 2B is a block diagram of a software architecture for implementing and/or otherwise facilitating, at least in part, the methods of FIGS. 3, 5, and 7, and the processes of FIGS. 4, 6, 8 and 9, according to an embodiment of the disclosure.

FIGS. 2A and 2B are block diagrams of software architectures for implementing and/or otherwise facilitating, at least in part, any or all of the below-described methods of FIGS. 3, 5, and 7, and processes of FIGS. 4, 6, and 8, including, without limitation, using networked computing environment (100), according to an embodiment of the disclosure. In an example, memory device(s) (e.g., 144 and 166) of the above-described network entities of networked computing environment (100) include at least one non-transient computer-readable medium (e.g., 600a and 600b). Non-transient computer-readable medium stores as software (e.g., 601a and 601b) processor-executable instructions for implementing and/or otherwise facilitating, at least in part, the disclosed steps of any or all of the methods and processes described below, including, without limitation, using networked computing environment (100). In an example, processor-executable instructions stored as software (601a and 601b) include one or more software modules (e.g., 602a and 602b). When executed by the processor(s) of the above-described network entities of networked computing environment (100) (e.g., one or more of: processor 126, 156, 158, 184, and 194) that are in communication with memory device(s) (e.g., one or more of: memory 139, 140, 166, 168, and 188), the processor-executable instructions cause the one or more processors to implement and/or otherwise perform, at least in part, one or more of the steps of any or all of the below-described methods and processes, including, without limitation, using networked computing environment (100).

In networked computing environment (100), memory devices (e.g., 139, 140, 166, 168, and 188) and processors (e.g., 126, 156, 158, 184, and 194) are in communication with one another via, and communicate with one another using electrical, electromagnetic, magnetic, optical, and/or other suitable signals (e.g., encoded data signals) transmitted and/or received through, a network (114). In an example, network (114) is, or includes, the Internet. In an example, networked computing environment (100) communication using network (114) includes wireless communication equipment and protocols. In another example, networked computing environment (100) communication using network (114) includes wired communication equipment and protocols. In yet another example, networked computing environment (100) communication using network (114) includes a combination of wireless and wired communication equipment and protocols. In an example, networked computing environment (100) communication using network (114) includes wireless and/or wired communication equipment and protocols for utilizing cloud-based data processing, data storage, and/or data communication resources.

In an example, networked computing environment (100) includes one or more users (not shown in FIG. 1) who perform and/or otherwise facilitate, at least in part, operations and/or steps of the methods described below. User(s) in networked computing environment (100) may include human user(s), user(s) composed of computing resources, and/or combinations thereof. In an example, user(s) include user groups (e.g., network groups) having operational and/or use authorization limited to one or more, but less than the total number of network entities in networked computing environment (100).

Figure 3:
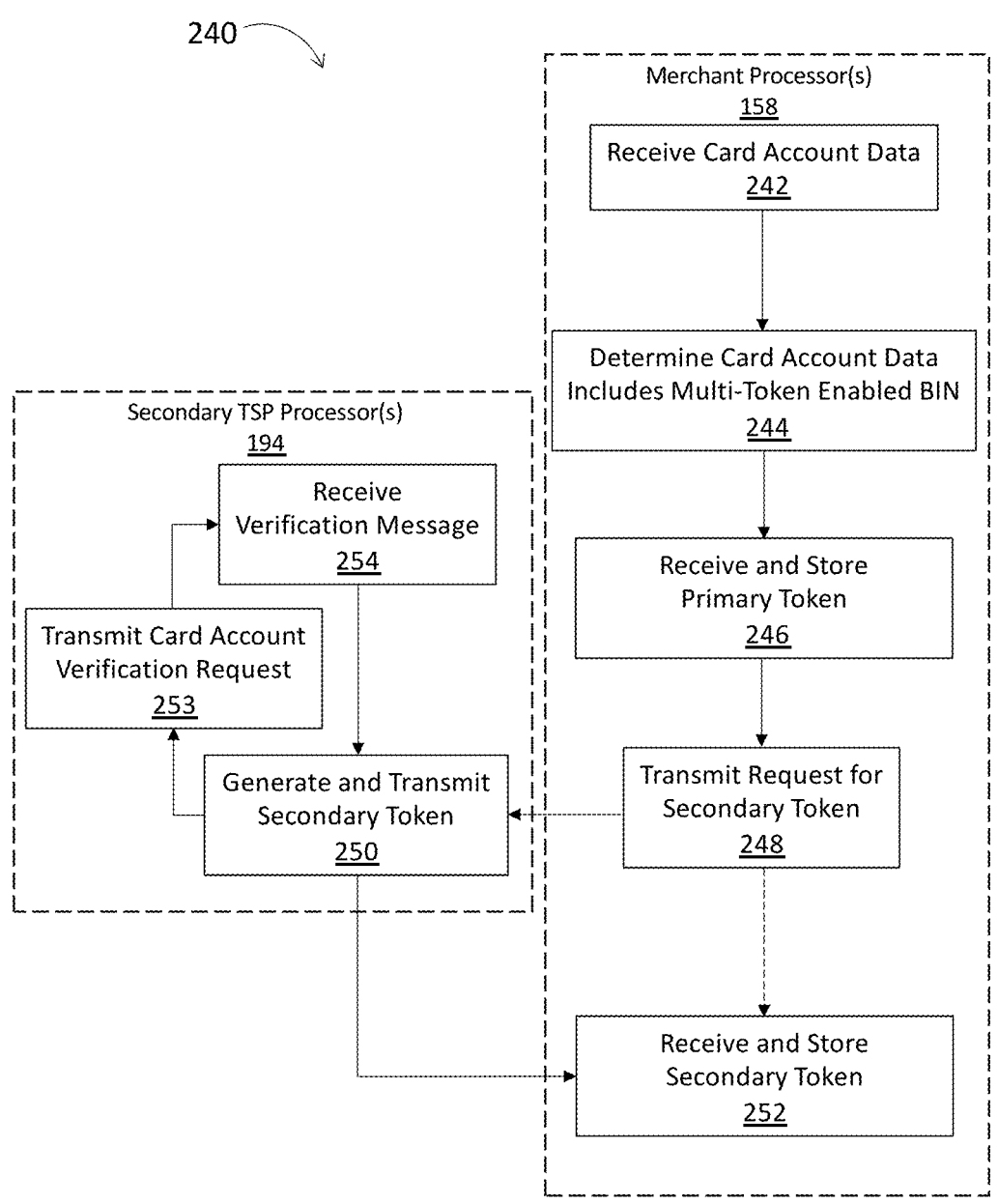
FIG. 3 is a flow chart of a method for provisioning tokens in the networked computing environment of FIG. 1, according to an embodiment of the disclosure.

FIG. 3 is a flow chart of a method (e.g., method (240)) for provisioning tokens (e.g., primary (176) and/or secondary (178) tokens) in a networked computing environment (e.g., networked computing environment (100)) including merchants (108) participating in payment (e.g., debit) networks. Referring to FIGS. 1-3, method 240 includes receiving (242), by a merchant processor (158), card account data (110) of a purchase card (106) from a cardholder (104). In embodiments for which the receiving (242) step is implemented and/or otherwise facilitated by software (601a), the merchant processor(s) (158) execute processor-executable instructions stored in a receiving module (604).

Method (240) includes determining (244), by the merchant processor (158), that the card account data (110) includes a multi-token enabled BIN (172). In embodiments for which the determining (244) step is implemented and/or otherwise facilitated by software (601a), the merchant processor(s) (158) execute processor-executable instructions stored in a determining module (606). Method (240) includes receiving and storing (246), by the merchant processor (158) and in the merchant memory (166), respectively, the primary token (176) associated with the front-of-card brand of the purchase card (106). In an embodiment, the merchant processor (158) performs the receiving and storing (246) step in method (240) in response to determining (244) that the card account data (110) includes the multi-token enabled BIN (172). In an embodiment, the receiving and storing (246) step includes receiving and storing (246) the primary token (176) from the primary TSP (112). In embodiments for which the receiving and/or storing (246) step(s) is/are implemented and/or otherwise facilitated by software (601a), the merchant processor(s) (158) execute processor-executable instructions stored in receiving (608) and/or storing (610) module(s).

Method (240) includes transmitting (248), by the merchant processor (158), a request for a secondary token (178). In an embodiment, the merchant processor (158) performs the transmitting (248) step in method (240) in response to receiving (246) the primary token (176). In an embodiment, the transmitting (248) step includes transmitting (248) the request for the secondary token (178) to the secondary TSP processor (194) of the secondary TSP (116) associated with the back-of-card brand of the purchase card (106). In embodiments for which the transmitting (248) step is implemented and/or otherwise facilitated by software (601a), the merchant processor(s) (158) execute processor-executable instructions stored in a transmitting module (611).

Method (240) includes receiving and storing (252), by the merchant processor (158) and in the merchant memory (166), respectively, the secondary token (178) simultaneously with storing (246) the primary token (176). In an embodiment, the primary token (176) is received and stored (246) in merchant memory (166) prior to the secondary token (178) being received and stored (252) in merchant memory (166). By receiving and storing (252) the secondary token (178) simultaneously with storing (246) the primary token (176), the result is that the primary (176) and secondary (178) are both stored in merchant memory (166) as co-existent, side-by-side tokens (164). The primary (176) and secondary (178) may be stored in merchant memory (166) as side-by-tokens (164) regardless of the order in which the primary (176) and secondary (178) tokens are received by the merchant processor (158). In some examples, the primary (176) and secondary (178) tokens may both be received substantially simultaneously by the merchant processor (158), with the result being the same-namely, simultaneous storage of primary (176) and secondary (178) tokens as side-by-side tokens (164) in the merchant memory (166). In embodiments for which the receiving and/or storing (252) step is/are implemented and/or otherwise facilitated by software (601a), the merchant processor(s) (158) execute processor-executable instructions stored in receiving (612) and/or storing (614) module(s).

In an embodiment, method (240) includes generating and transmitting (250), by the secondary TSP processor (194), the secondary token (178) to the merchant processor (158). In an embodiment, the secondary TSP processor (194) generates and transmits (250) the secondary token (178) to the merchant processor (158) in response to receiving the request for the secondary token (178) from the merchant processor (158). In embodiments for which the generating and/or transmitting (250) step is/are implemented and/or otherwise facilitated by software (601b), the secondary TSP processor(s) (194) execute processor-executable instructions stored in generating (615) and/or transmitting (617) module(s).

In an embodiment, method (240) includes transmitting (253), by the secondary TSP processor (194), a card account data (110) verification request for verification by a card issuer (120). In an embodiment, the secondary TSP processor (194) transmits (253) the card account data (110) verification request in response to receiving the request for the secondary token (178) from the merchant processor (158). As described below with reference to FIG. 5, the secondary TSP processor (194) may, in fact, transmit (253) the card account data (110) verification request indirectly to issuer (120) by way of the selected network (124) (e.g., primary (112) or secondary (116) TSP, selected based on the predetermined network routing preferences (170)), and this verification request may be transmitted in conjunction with a token processing request to issuer (120). In embodiments for which the transmitting (253) step is implemented and/or otherwise facilitated by software (601b), the secondary TSP processor(s) (194) execute processor-executable instructions stored in a transmitting module (619).

In an embodiment, method (240) includes receiving (254), by the secondary TSP processor (194), a verification message indicating that the card account data (110) is verified. In embodiments for which the receiving (254) step is implemented and/or otherwise facilitated by software (601b), the secondary TSP processor(s) (194) execute processor-executable instructions stored in a receiving module (621). In an embodiment, the step of generating and transmitting (250) the secondary token (178) includes generating and transmitting (250) the secondary token (178) in response to receiving (254) the verification message.

Figure 4:
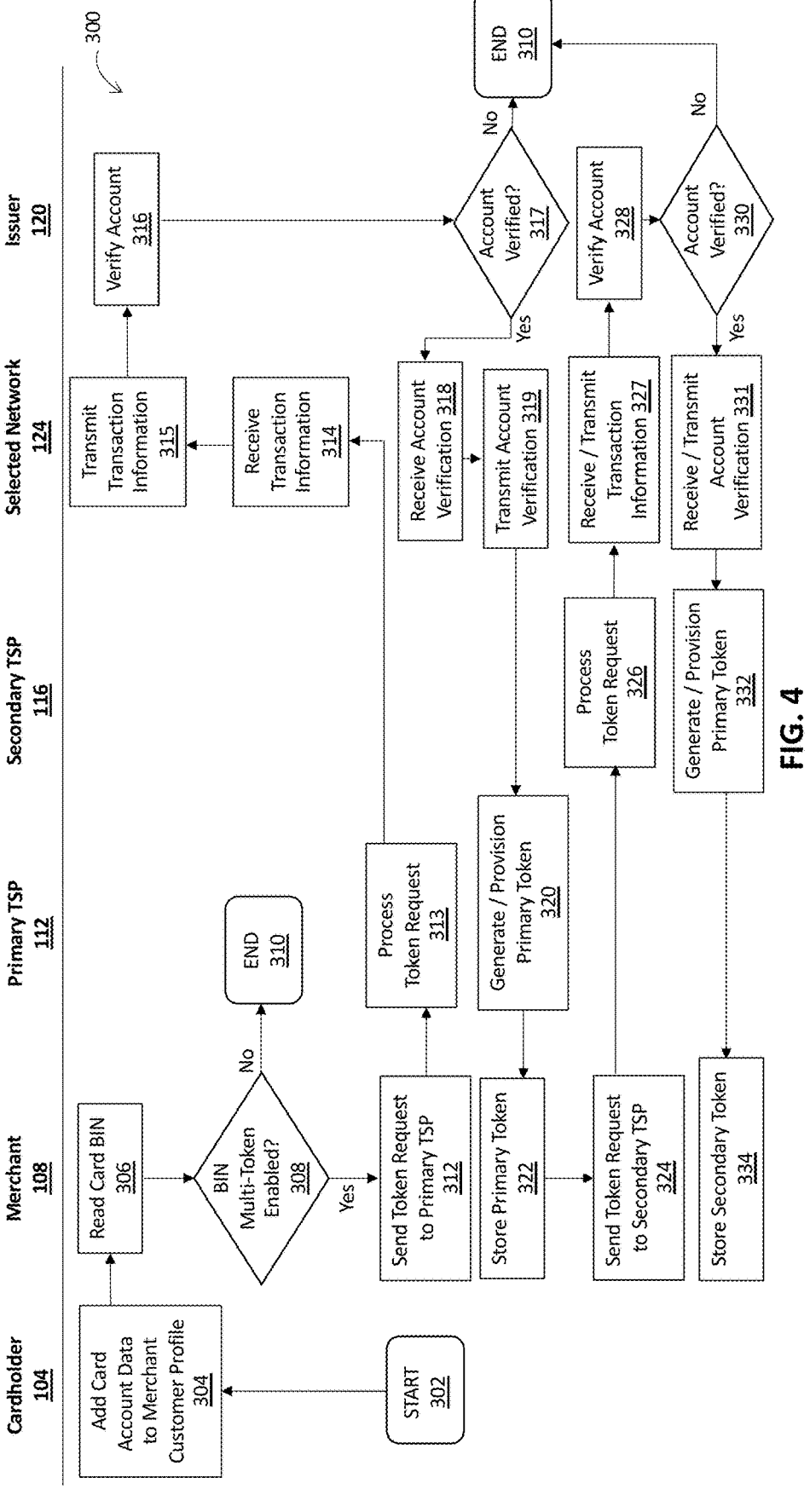
FIG. 4 is a sequence and state diagram of a token provisioning process implemented by the method of FIG. 4, according to an embodiment of the disclosure.

FIG. 4 is a sequence and state diagram of a token provisioning process (e.g., process (300)) implemented by the method of FIG. 4 (e.g., method (240)), according to an embodiment of the disclosure. Process (300) begins with a start state (302) and proceeds to block (304), which is performed by cardholder (104). In block (304), cardholder (104) adds his or her card account data (142) to the customer profile (174) of the merchant (108) website. Alternatively, the cardholder (104) may provide the card account data (142) to the merchant (108) through channels other than a merchant (108) website, and merchant (108) store that information in merchant memory (166) and/or elsewhere. From block (304), process (300) proceeds to block (306), which is performed by merchant (108). In block (306), merchant processor (158) reads the card BIN (172). From block (306), process (300) proceeds to logic branch (308), also performed by merchant (108). In branch (308), merchant processor (158) determines if the card BIN (172) read in block (306) is a multi-token enabled BIN (172). If merchant processor (158) determines in branch (308) that the card BIN (172) is not multi-token enabled, then process (300) proceeds to an end state (310).

If merchant processor (158) determines in branch (308) that the card BIN (172) is multi-token enabled, process (300) proceeds to block (312), also performed by merchant (108). In block (312), merchant processor (158) sends a token request (e.g., a request for the primary token (176)) to the primary TSP (112). From block (312), process (300) proceeds to block (313), which is performed by primary TSP (112). In block (313), primary TSP processor (184) processes the token request received from the merchant (108). From block (313), process (300) proceeds to block (314), which is performed by the selected network (124) (e.g., primary (112) or secondary (116) TSP, selected based on the predetermined network routing preferences (170)). In block (314), the selected network (124) receives transaction information from primary TSP (184). From block (314), process (300) proceeds to block (315), which is performed by the selected network (124). In block (315), the selected network (124) transmits the transaction information to the purchase card (106) issuer (120). From block (315), process (300) proceeds to block (316), which is performed by the purchase card (106) issuer (120). In block (316), issuer processor (126) verifies the cardholder (104) account (e.g., the account data (142) associated with the primary token (176)). From block (316), process (300) proceeds to logic branch (317), also performed by issuer (120). In branch (317), issuer (120) (e.g., using issuer processor (126)) determines if the cardholder (104) account is verified. If issuer processor (126)

determines in branch (317) that the cardholder (104) account is not verified, then process (300) proceeds to end state (310).

If issuer (120) determines in branch (317) that the cardholder (104) account is verified, process (300) proceeds to block (318), which is performed by the selected network (124). In block (318), the selected network (124) receives account verification from issuer (120). From block (318), process (300) proceeds to block (319), which is performed by the selected network (124). In block (319), the selected network (124) transmits the account verification to the primary TSP (112). In block (320), primary TSP processor (184) generates and/or provisions the primary token (176). From block (320), process (300) proceeds to block (322), which is performed by merchant (108). In block (322), merchant processor (158) stores the primary token (176) in merchant memory (166). From block (322), process (300) proceeds to block (324), also performed by merchant (108). In block (324), merchant processor (158) sends a token request (e.g., a request for the secondary token (178)) to the secondary TSP (116). From block (324), process (300) proceeds to block (326), which is performed by secondary TSP (116). In block (326), secondary TSP processor (194) processes the token request received from merchant (108).

From block (326), process (300) proceeds to block (327), which is performed by the selected network (124). In block (327), the selected network (124) receives, and then transmits, the transaction information to the purchase card (106) issuer (120). From block (327), process (300) proceeds to block (328), which is performed by issuer (120). In block (328), issuer processor (126) verifies the cardholder (104) account (e.g., the account data (142) associated with the secondary token (178)). From block (328), process (300) proceeds to logic branch (330), also performed by issuer (120). In branch (330), issuer processor (126) determines if the cardholder (104) account is verified. If issuer processor (126) determines in branch (330) that the cardholder (104) account is not verified, then process (300) proceeds to end state (310).

If issuer processor (126) determines in branch (330) that the cardholder (104) account is verified, process (300) proceeds to block (331), which is performed by the selected network (124). In block (331), the selected network (124) receives, and then transmits, the account verification to the secondary TSP (116). From block (331), process (300) proceeds to block (332), which is performed by secondary TSP (116). In block (332), secondary TSP processor (194) generates and/or provisions the secondary token (178). From block (332), process (300) proceeds to block (334), which is performed by merchant (108). In block (334), merchant processor (158) stores the secondary token (178) in merchant memory (166) (e.g., as side-by-side tokens (164) with primary token (176)). From block (334), process (300) proceeds to end state (310).

Figure 5:
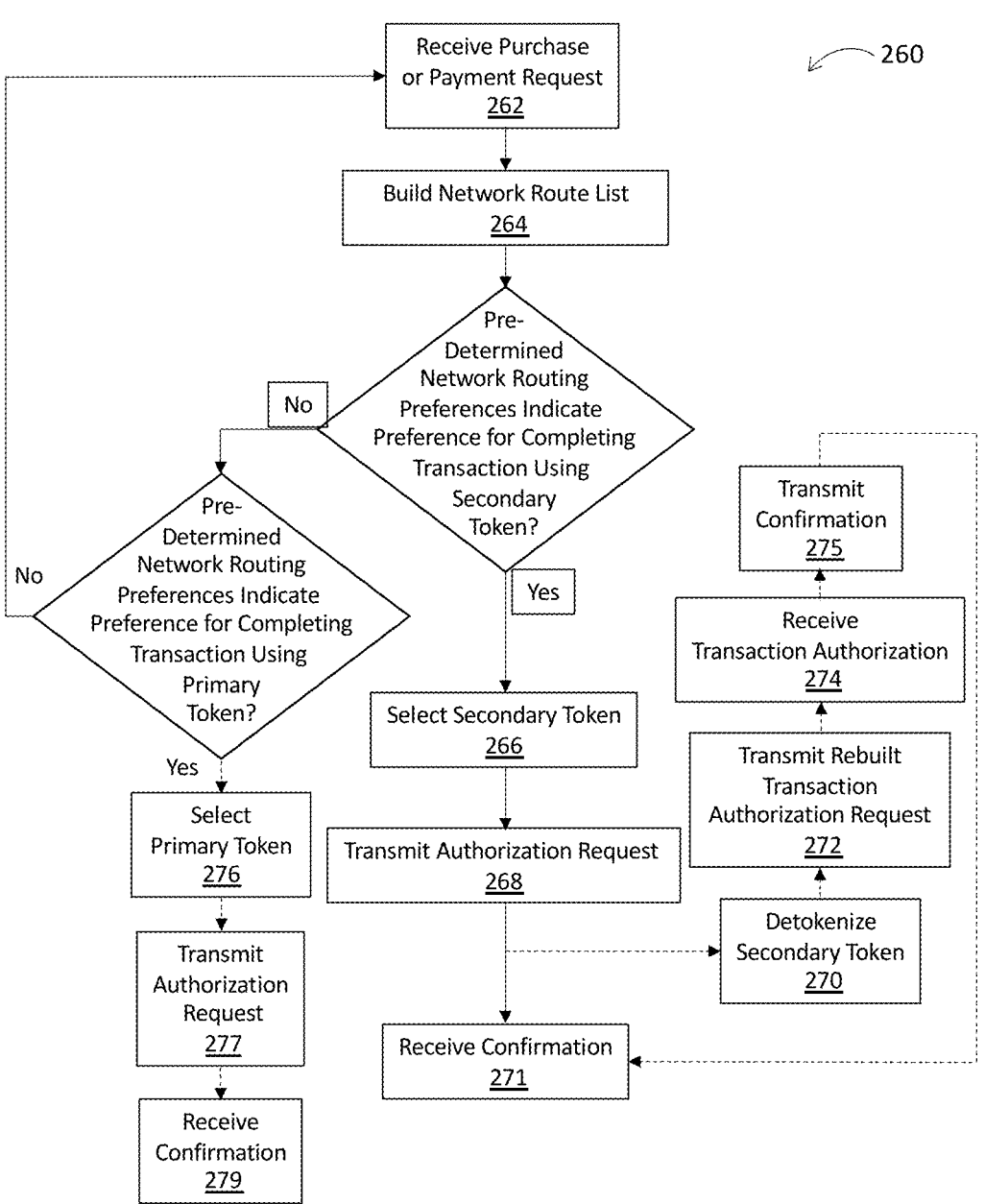
FIG. 5 is a flow chart of a method for processing purchase or payment transactions in the networked computing environment of FIG. 1, according to an embodiment of the disclosure.

FIG. 5 is a flow chart of a method (e.g., method (260)) for processing purchase and/or payment transactions in a networked computing environment (e.g., networked computing environment (100)) including merchants (108) participating in payment (e.g., debit) networks. Referring to FIGS. 1, 2, and 5, method (260) includes receiving (262), by merchant processor (158), a purchase (e.g., checkout) or payment request from a cardholder/customer (104) (or. alternatively, from merchant (108) that is pre-authorized by cardholder (104)). In an embodiment, method (260) includes simultaneously storing, by the merchant processor (158), the card account data (110) as: (i) the primary token (176) for the front-of-card brand of the purchase card (106); and (ii) the secondary token (178) for the back-of-card brand of the purchase card (106). In embodiments for which the receiving (262) step is implemented and/or otherwise facilitated by software (601a), the merchant processor(s) (158) execute processor-executable instructions stored in a receiving module (622).

Method (260) includes building (264), by the merchant processor (158), network route list (173) based on merchant (108)-defined predetermined network routing preferences (170). In an embodiment, merchant processor (158) performs the building (264) step in method (260) in response to receiving (262) the purchase or payment request from the cardholder (104). In embodiments for which the building (264) step is implemented and/or otherwise facilitated by software (601a), the merchant processor(s) (158) execute processor-executable instructions stored in a building module (624).

For the predetermined network routing preferences (170) indicating a preference for completing the purchase or payment transaction using the secondary token (178), method (260) includes selecting (266), by the merchant processor (158), the secondary token (178) for the purchase or payment request. In embodiments for which the selecting (266) step is implemented and/or otherwise facilitated by software (601a), the merchant processor(s) (158) execute processor-executable instructions stored in a selecting module (626). In a use case, the merchant processor(s) (158) interrogate every purchase or payment transaction as to whether it will be routed to the primary (e.g., Mastercard®) or secondary (e.g., Pulse®) network. For the predetermined network routing preferences (170) indicating the preference for completing the purchase or payment transaction using the secondary token (178), method (260) includes transmitting (268), by the merchant processor (158), an authorization request to a payment (e.g., debit) network (119) associated with the secondary token (178). In an example, this authorization request is transmitted (268) to secondary TSP processor (194). In embodiments for which the transmitting (268) step is implemented and/or otherwise facilitated by software (601a), the merchant processor(s) (158) execute processor-executable instructions stored in a transmitting module (628). For the predetermined network routing preferences (170) indicating the preference for completing the purchase or payment transaction using the secondary token (178), method (260) includes receiving (271), by the merchant processor (158), an purchase or payment request confirmation. In embodiments for which the receiving (271) step is implemented and/or otherwise facilitated by software (601a), the merchant processor(s) (158) execute processor-executable instructions stored in a receiving module (630).

In an embodiment, for the predetermined network routing preferences (170) indicating the preference for completing the purchase or payment transaction using the secondary token (178), the method (260) also includes detokenizing (270), by the payment network (119) associated with the secondary token (178), the secondary token (178). In an example, the detokenizing (270) step is performed in method (260) before receiving (271) the purchase or payment request confirmation and after transmitting (268) the authorization request to the payment network (119) associated with the secondary token (178). In an example, the secondary TSP processor (194) detokenizes (270) the secondary token (178). In embodiments for which the detokenizing (270) step is implemented and/or otherwise facilitated by software (601b), the secondary TSP processor(s) (194) execute processor-executable instructions stored in a detokenizing module (631).

In an embodiment, for the predetermined network routing preferences (170) indicating the preference for completing the purchase or payment transaction using the secondary token (178), the method (260) also includes transmitting (272), by the payment network (119) associated with the secondary token (178), a rebuilt purchase or payment transaction authorization request to an issuer (120) of the purchase card (106). In an example, the transmitting (272) step is performed in method (260) before receiving (271) the purchase or payment request confirmation and after transmitting (268) the authorization request to the payment network (119) associated with the secondary token (178). In an example, the secondary TSP processor (194) transmits (272) the rebuilt purchase or payment transaction authorization request to the issuer (120). In embodiments for which the transmitting (272) step is implemented and/or otherwise facilitated by software (601b), the secondary TSP processor(s) (194) execute processor-executable instructions stored in a transmitting module (633).

In an embodiment, for the predetermined network routing preferences (170) indicating the preference for completing the purchase or payment transaction using the secondary token (178), the method (260) also includes receiving (274), by the payment network (119) associated with the secondary token (178), a purchase or payment transaction authorization acknowledgement from the issuer (120). In an example, the receiving (274) step is performed in method (260) before receiving (271) the purchase or payment request confirmation and after transmitting (268) the authorization request to the payment network (119) associated with the secondary token (178). In an example, the secondary TSP processor (194) receives (274) the purchase or payment transaction authorization acknowledgement from the issuer (120). In embodiments for which the receiving (274) step is implemented and/or otherwise facilitated by software (601b), the secondary TSP processor(s) (194) execute processor-executable instructions stored in a receiving module (635).

In an embodiment, method (260) includes transmitting (275), by the payment network (119) associated with the secondary token (178), the purchase or payment request confirmation to the merchant processor (158). In an example, the transmitting (275) step is performed in method (260) in response to the payment network (119) associated with the secondary token (178) receiving (274) the purchase or payment transaction authorization acknowledgment from issuer (120). In an example, the secondary TSP processor (194) transmits (275) the purchase or payment request confirmation to the merchant processor (158). In embodiments for which the transmitting (275) step is implemented and/or otherwise facilitated by software (601b), the secondary TSP processor(s) (194) execute processor-executable instructions stored in a transmitting module (637).

In an embodiment, for the predetermined network routing preferences (170) indicating the preference for completing the purchase or payment transaction using the primary token (176), method (260) further includes selecting (276), by the merchant processor (158), the primary token (176) for the purchase or payment request. In embodiments for which the selecting (276) step is implemented and/or otherwise facilitated by software (601a), the merchant processor(s) (158) execute processor-executable instructions stored in a selecting module (638).

In an embodiment, for the predetermined network routing preferences (170) indicating the preference for completing the purchase or payment transaction using the primary token (176), method (260) further includes transmitting (277), by the merchant processor (158), an authorization request to a payment network (118) associated with the primary token (176). In an example, merchant processor(s) (158) transmit (277) this authorization request to the primary TSP (112). In embodiments for which the transmitting (277) step is implemented and/or otherwise facilitated by software (601a), the merchant processor(s) (158) execute processor-executable instructions stored in a transmitting module (640).

In an embodiment, for the predetermined network routing preferences (170) indicating the preference for completing the purchase or payment transaction using the primary token (176), method (260) further includes receiving (279), by the merchant processor (158), a purchase or payment request confirmation from the payment network (118) associated with the primary token (176). In an example, the purchase or payment request confirmation received by the merchant processor (158) from the payment network (118) associated with the primary token (176) indicates (e.g., to the merchant processor (158)) that the purchase or payment transaction for the primary token (176) is authorized by the issuer (120) of the purchase card (106). In an example, merchant processor(s) (158) receive (279) this purchase or payment request confirmation from the primary TSP (112). In embodiments for which the receiving (279) step is implemented and/or otherwise facilitated by software (601a), the merchant processor(s) (158) execute processor-executable instructions stored in a receiving module (642).

Figure 6:
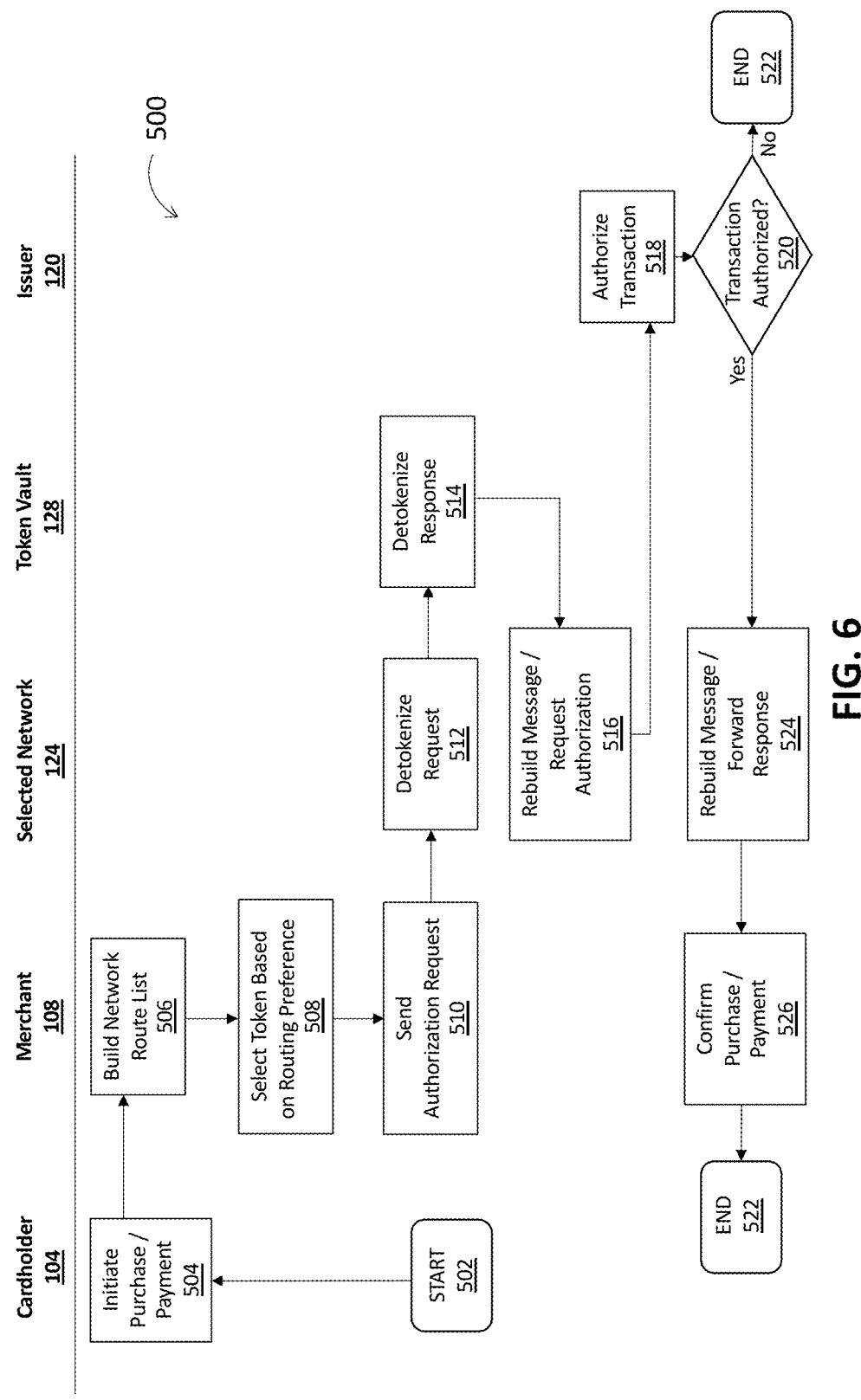
FIG. 6 is a sequence and state diagram of a process for purchase or payment transaction processing implemented by the method of FIG. 5, according to an embodiment of the disclosure.

FIG. 6 is a sequence and state diagram of a process (e.g., process (500)) for purchase and/or payment transaction processing implemented by the method of FIG. 5 (e.g., method (260)), according to an embodiment of the disclosure. Process (500) begins with a start state (502) and proceeds to block (504), which is performed by cardholder (104). In block (504), cardholder (104) (or, alternatively, merchant (108) that is pre-authorized by cardholder (104)), initiates a purchase or payment process after, for example and without limitation, selecting goods and/or services offered for sale on a merchant (108) online shopping website and adding the selected items to the shopping cart (180). From block (504), process (500) proceeds to block (506), which is performed by merchant (108). In block (506), merchant processor (158) builds the network route list. From block (506), process (500) proceeds to block (508), also performed by merchant (108). In block (508), merchant processor (508) selects a token (e.g., one of the primary (176) and secondary (178) tokens stored as side-by-side tokens (164) in merchant memory (166)) based on routing preferences (e.g., based on the predetermined network routing preferences (170)).

From block (508), process (500) proceeds to block (510), also performed by merchant (108). In block (510), merchant processor (158) sends an authorization request to the selected network (124) (e.g., primary (112) or secondary (116) TSP, selected based on the predetermined network routing preferences (170)). From block (510), process (500) proceeds to block (512), which is performed by the selected network (124). In block (512), processor(s) of the selected network (124) (e.g., primary (184) or secondary (194) TSP processor) create and/or send a detokenize request to the token vault (127 or 128, as shown in FIG. 1). From block (512), process (500) proceeds to block (514), which is implemented, at least in part, by token vault (127 or 128). In block (514), the primary (176) token or the secondary (178) token is detokenized (e.g., by primary (184) or secondary (194) TSP processor) in response to the detokenize request received from the selected network (124). In an embodiment, in block (514), a response to the detokenize request of block (512) includes an encrypted message. In an example, the network routing logic function(s) of, for instance, process (500), moves from the acquirer (192) to the merchant (108) wallet provider/e-commerce platform.

From block (516), process (500) proceeds to block (516), which is performed by the selected network (124). In block (516), selected network (124) processor (e.g., primary (184) or secondary (194) TSP processor) rebuilds (e.g., decrypts) the message and sends an authorization request to the issuer (120). From block (516), process (500) proceeds to block (518), which is performed by issuer (120). In block (518), issuer processor (126) authorizes the purchase or payment transaction between the cardholder (104) and the merchant (108), which involves the purchase card (106). From block (518), process (500) proceeds to logic branch (520), which is performed by issuer (120). In branch (520), issuer processor (126) determines if the transaction is authorized. If issuer processor (126) determines in branch (520) that the purchase or payment transaction is not authorized, then process (500) proceeds to an end state (522). In an example, the end state (522) transition in process (500) includes notifying the merchant (108) and/or the cardholder (106) that the purchase or payment transaction is not authorized.

If issuer processor (126) determines in branch (520) that the purchase or payment transaction is authorized, then process (500) proceeds to block (524), which is performed by the selected network (124). In an embodiment, in branch (520), an affirmative response to the authorization request of block (516) includes an encrypted message. In block (524), processor of the selected network (124) rebuilds (e.g., decrypts) the message and forwards the issuer (120) response to the merchant (108). From block (524), process (500) proceeds to block (526), which is performed by merchant (108). In block (526), merchant processor (158) confirms the purchase or payment request and provides a notification to that effect to the cardholder (104). From block (526), process (500) proceeds to end state (522). In an example, process (500) transitions from end state (522) to start state (502) iteratively for each of a plurality of purchase and/or payment transactions. In another example, a plurality of instances of process (500) run in parallel for processing a plurality of purchase and/or payment transactions simultaneously.

Figure 7:
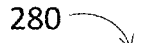
FIG. 7 is a flow chart of a method for automatically updating tokenized purchase card account data of online merchant customers in the networked computing environment of FIG. 1, according to an embodiment of the disclosure.
Figure 7:
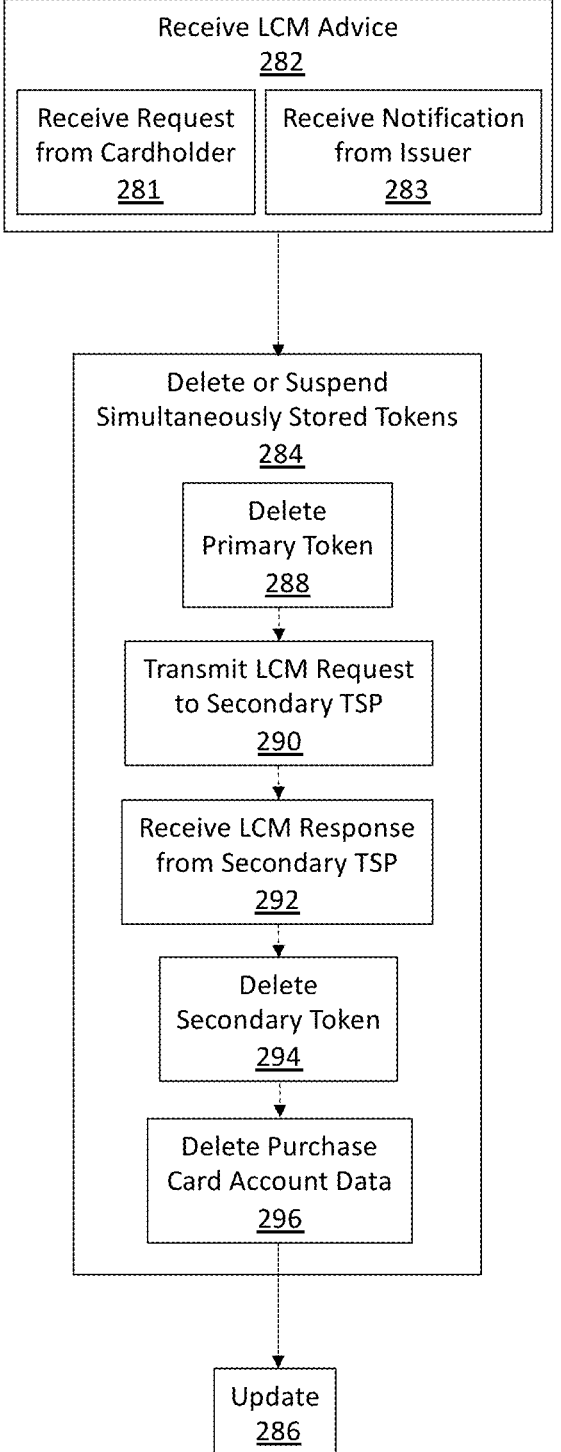

FIG. 7 is a flow chart of a method (e.g., method (280)) for automatically updating tokenized purchase card account data (142) of customers (104) of merchants (108) participating in payment (e.g., debit) networks in a networked computing environment (100). Referring to FIGS. 1, 2, and 7, method 260 includes receiving (282), by merchant processor (158), a life cycle management (LCM) advice for purchase card (106) account data (142) of cardholder (104) from a network entity having custodial authority over the purchase card (106) account data (142). In embodiments for which the receiving (282) step is implemented and/or otherwise facilitated by software (601a), the merchant processor(s) (158) execute processor-executable instructions stored in a receiving module (644).

In an embodiment, the network entity having custodial control over the purchase card (106) account data (142) is the cardholder (104). In the embodiment, the receiving (282) step of method (280) includes receiving (281) a request from the cardholder (104) to delete, update, and/or otherwise change the purchase card (106) account data (142) in the customer profile (174). In embodiments for which the receiving (281) step is implemented and/or otherwise facilitated by software (601a), the merchant processor(s) (158) execute processor-executable instructions stored in a receiving module (646).

In an embodiment, the network entity having custodial control over the purchase card (106) account data (142) is the issuer (120) of the purchase card (106). In the embodiment, the receiving (282) step of method (280) includes receiving (283) a notification of a cardholder (104) account closure or suspension from the issuer (120). In embodiments for which the receiving (283) step is implemented and/or otherwise facilitated by software (601a), the merchant processor(s) (158) execute processor-executable instructions stored in a receiving module (648).

Method (280) includes deleting or suspending (284), by the merchant processor (158), simultaneously stored tokens associated with the purchase card (106) account data (142) of the cardholder (104) from a merchant memory (166). In an example, the simultaneously stored tokens include the primary (176) and secondary (178) tokens. In an example, the primary (176) and secondary (178) tokens are stored as side-by-side tokens (164) in merchant memory (166). In an example, the deleting or suspending (284) step is performed in method (280) in response to receiving (282) the LCM advice from the network entity having custodial control over the purchase card (106) account data (142). In embodiments for which the deleting and/or suspending (284) step(s) is/are implemented and/or otherwise facilitated by software (601a), the merchant processor(s) (158) execute processor-executable instructions stored in deleting (650) and/or suspending (652) module(s).

In an embodiment, the deleting or suspending (284) step includes deleting (288), by the merchant processor (158), the primary token (176) from the merchant memory (166). In embodiments for which the deleting (288) step is implemented and/or otherwise facilitated by software (601a), the merchant processor(s) (158) execute processor-executable instructions stored in a deleting module (654). In the embodiment, the deleting or suspending (284) step also includes transmitting (290), by the merchant processor (158), an LCM request to the secondary TSP processor (194) of the secondary TSP (116) associated with the secondary token (178). In an example, the transmitting (290) step is performed in method (280) in response to the deleting (288) of the primary token (176) by the merchant processor (158). In embodiments for which the transmitting (290) step is implemented and/or otherwise facilitated by software (601a), the merchant processor(s) (158) execute processor-executable instructions stored in a transmitting module (656).

In the embodiment, the deleting or suspending (284) step also includes receiving (292), by the merchant processor (158), an LCM response from the secondary TSP processor (194). In embodiments for which the receiving (292) step is implemented and/or otherwise facilitated by software (601a), the merchant processor(s) (158) execute processor-executable instructions stored in a receiving module (658). In the embodiment, the deleting or suspending (284) step further includes deleting (294), by the merchant processor (158), the secondary token (178) from the merchant memory (166). In embodiments for which the deleting (294) step is implemented and/or otherwise facilitated by software (601a), the merchant processor(s) (158) execute processor-executable instructions stored in a deleting module (660).

In an embodiment, method (280) also includes deleting (296), by the merchant processor (158), the purchase card (106) account data (142) from the customer profile (174). In embodiments for which the deleting (296) step is implemented and/or otherwise facilitated by software (601a), the merchant processor(s) (158) execute processor-executable instructions stored in a deleting module (664).

Method (280) includes updating (286), by the merchant processor (158), the customer profile (174) of the cardholder (104) stored as data in the merchant memory (166). In an example, the updating (286) step is performed in method (280) during and/or after the deleting or suspending (284) step(s) is/are performed in method (280). In embodiments for which the updating (284) step is implemented and/or otherwise facilitated by software (601*a*), the merchant processor(s) (158) execute processor-executable instructions stored in an updating module (662).

Figure 8:
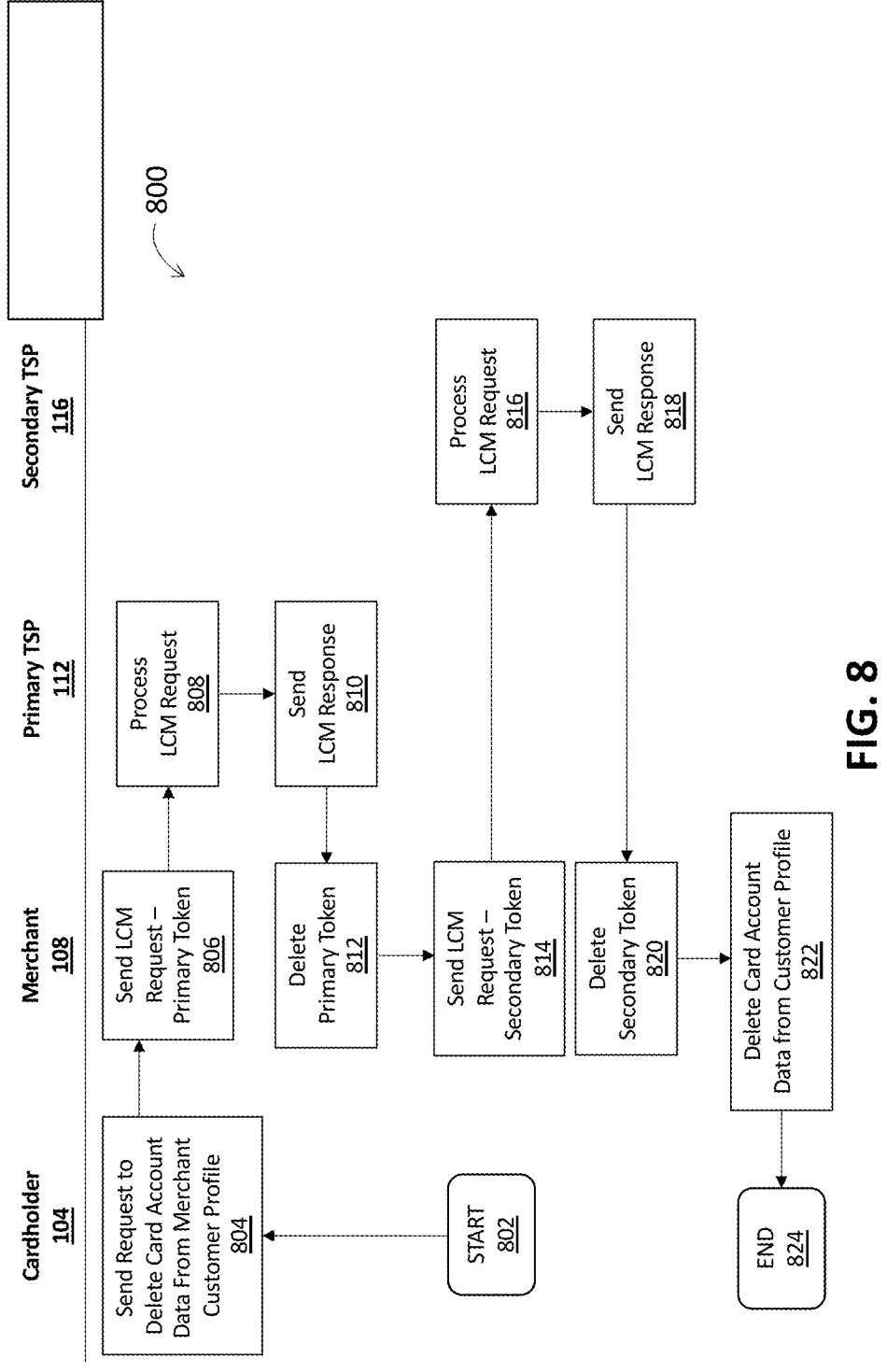
FIG. 8 is a sequence diagram and flow chart of a cardholder-initiated process for updating tokenized purchase card account data implemented by the method of FIG. 7, according to an embodiment of the disclosure.

FIG. 8 is a sequence diagram and flow chart of a cardholder (104)-initiated process (e.g., process 800) for updating tokenized purchase card account data implemented by the method of FIG. 7 (e.g., method (280)), according to an embodiment of the disclosure. In a use case, process (800) enables cardholder (104) to delete payment credentials from the respective merchant (108) profile. Process (800) begins with a start state (802) and proceeds to block (804), which is performed by cardholder (104). In block (804), cardholder (104) sends a request to delete, change, and/or update card account data (142) from his or her customer profile (174) stored by the merchant (108) (e.g., to delete the actual PAN name of their purchase card (106)). From block (804), process (800) proceeds to block (806), which is performed by merchant (108). In block (806), merchant processor (158) sends a primary token (176) LCM request to the primary TSP (112). From block (806), process (800) proceeds to block (808), which is performed by the primary TSP (112). In block (808), primary TSP processor (184) processes the primary token (176) LCM request. From block (808), process (800) proceeds to block (810), also performed by primary TSP (112). In block (810), primary TSP processor (184) sends a primary token (176) LCM response to the merchant (108).

From block (810), process (800) proceeds to block (812), which is performed by merchant (108). In block (812), merchant processor (158) deletes the primary token (176) associated with cardholder/customer (104) from merchant memory (166). From block (812), process (800) proceeds to block (814), also performed by merchant (108). In block (814), merchant processor (158) sends a secondary token (178) LCM request to the secondary TSP (116). From block (814), process (800) proceeds to block (816), which is performed by the secondary TSP (116). In block (816), secondary TSP processor (194) processes the secondary token (178) LCM request. From block (816), process (800) proceeds to block (818), also performed by secondary TSP (116). In block (818), secondary TSP processor (194) sends a secondary token (178) LCM response to the merchant (108). From block (818), process (800) proceeds to block (820), which is performed by merchant (108). In block (820), merchant processor (158) deletes the secondary token (178) associated with cardholder/customer (104) from merchant memory (166). From block (820), process (800) proceeds to block (822), also performed by merchant (108). In block (822), merchant processor (158) deletes the card account data (142) from the customer profile (174) of the cardholder/customer (104). From block (822), process (800) proceeds to an end state (824). In an example, process (800) transitions from end state (522) to start state (502) iteratively for each of a plurality of cardholder (104)-initiated requests to delete, change, and/or update card account data (142) from respective customer profiles (174). In another example, a plurality of instances of process (800) run in parallel for simultaneously processing a plurality of cardholder (104)-initiated requests to delete, change, and/or update card account data (142) from respective customer profiles (174).

Figure 9:
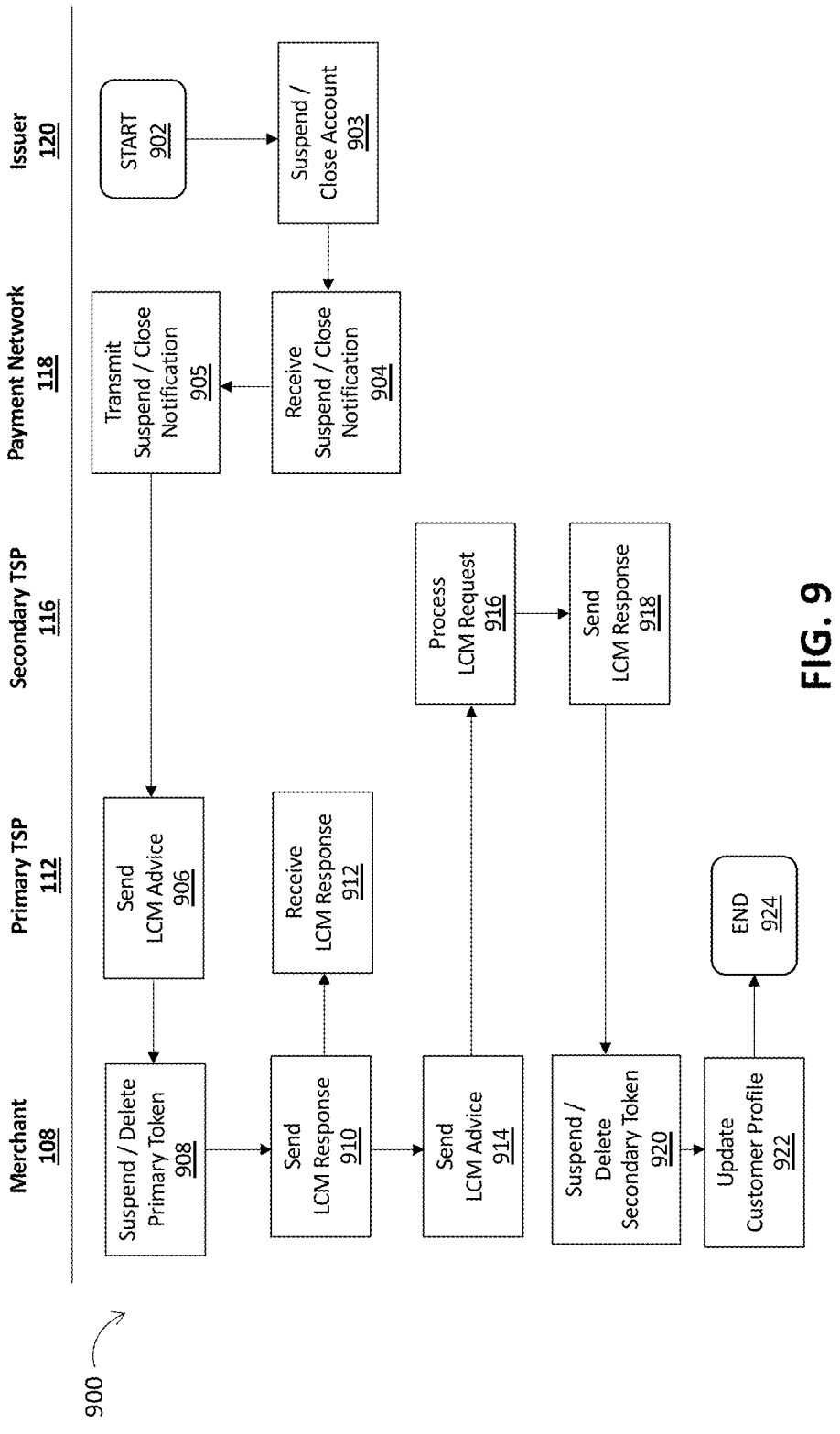
FIG. 9 is a sequence diagram and flow chart of an issuer-initiated process for updating tokenized purchase card account data implemented by the method of FIG. 7, according to an embodiment of the disclosure.

FIG. 9 is a sequence diagram and flow chart of an issuer (120)-initiated process (e.g., process (900)) for updating tokenized purchase card (106) account data (142) implemented by the method of FIG. 7 (e.g., method (280)), according to an embodiment of the disclosure. In a use case, process (900) enables issuer (120) to notify token service providers (112 and/or 116) of account closure or change(s) to actual card (106) PAN and expiration date. Process (900) begins with a start state (902) and proceeds to block (903), which is performed by issuer (120). In block (903), issuer (120) suspends or deletes the account of the cardholder (104) associated with the purchase card (106). From block (903), process (900) proceeds to block (904), which is performed by the payment network (118). In block (904), payment network (118) receives a suspend/close notification from issuer (120). From block (904), process (900) proceeds to block (905), which is performed by the payment network (118). In block (905), payment network (118) transmits the suspend/close notification to the primary TSP (112). From block (905), proceeds to block (906), which is performed by primary TSP (112). In block (906), primary TSP processor (184) sends an LCM advice to the merchant (108). From block (906), process (900) proceeds to block (908), which is performed by merchant (108). In block (908), merchant processor (158) suspends or deletes the primary token (176) stored in merchant memory (166). From block (908), process (900) proceeds to block (910), also performed by merchant (108). In block (910), merchant processor (158) sends an LCM response to the primary TSP processor (184).

From block (910), process (900) proceeds to block (912), which is performed by the primary TSP (112). In block (912), primary TSP processor (184) receives the LCM response from the merchant processor (158). Also, from block (910), process (900) proceeds to block (914), which is performed by the merchant (108). In block (914), merchant processor (158) sends an LCM advice to the secondary TSP processor (194). From block (914), process (900) proceeds to block (916), which is performed by the secondary TSP (116). In block (916), secondary TSP processor (194) processes the LCM request received from the merchant processor (158). From block (916), process (900) proceeds to block (918), also performed by the secondary TSP (116). In block (918), secondary TSP processor (194) sends an LCM response to the merchant processor (158).

From block (918), process (900) proceeds to block (920), which is performed by the merchant (108). In block (920), merchant processor (158) suspends or deletes the secondary token (178) stored in merchant memory (166). From block (920), process (900) proceeds to block (922), also performed by merchant (108). In block (922), merchant processor (158) updates the customer profile (174) of the cardholder/customer (104). From block (922), process (900) proceeds to an end state (924). In an example, process (900) transitions from end state (924) to start state (902) iteratively for each of a plurality of issuer (120)-initiated requests to delete, change, and/or update card account data (142) from respective customer profiles (174). In another example, a plurality of instances of process (900) run in parallel for simultaneously processing a plurality of issuer (120)-initiated requests to delete, change, and/or update card account data (142) from respective customer profiles (174).

Figure 10:
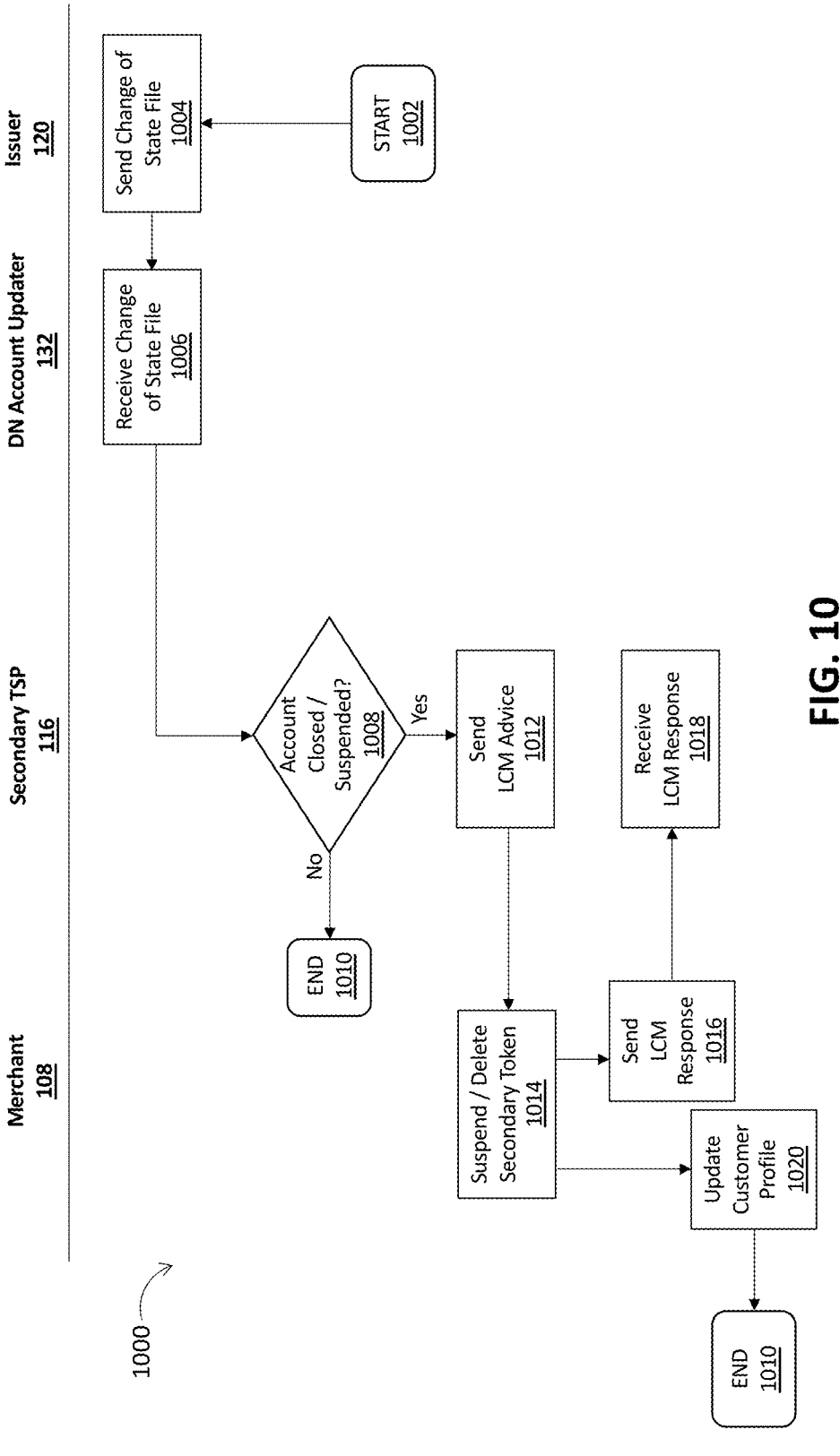
FIG. 10 is a sequence diagram and flow chart of an issuer-initiated process for updating tokenized purchase card account data, according to another embodiment of the disclosure.

FIG. 10 is a sequence diagram and flow chart of an issuer (120)-initiated process (e.g., process (1000)) for updating tokenized purchase card (106) account data (142), according to another embodiment of the disclosure. Process (1000) begins with a start state (1002) and proceeds to block (1004), which is performed by issuer (120). In block (1004), issuer (120) sends at least one change of state file (154) to the DN account updater (132). From block (1004), process (1000) proceeds to block (1006), which is performed by the DN account updater (132). In block (1006), DN account updater processor (156) receives the change of state file(s) (154). In an example, upon receipt of the change of state file(s) (154), DN account updater processor (156) stores the change of state file(s) in a DN account updater database. From block (1006), process (1000) proceeds to logic branch (1008), which is performed by the secondary TSP (116). In branch (1008), secondary TSP processor (194) determines, based on the change of state file(s) (154) received in block (1006), if the cardholder's (104) account with issuer (120) is closed or suspended. In an example, secondary TSP processor (194) performs logic branch (1008) operations on a periodic basis to check if a cardholder account (104) is closed or suspended (e.g., at user-predetermined intervals of time). If secondary TSP processor (194) determines in branch (1008) that the cardholder's (104) account with issuer (120) is not closed or is not suspended, then process (1000) proceeds to an end state (1010).

If secondary TSP processor (194) determines in branch (1008) that the cardholder's (104) account with issuer (120) is closed or suspended, then process (1000) proceeds to block (1012), also performed by secondary TSP (116). In block (1012), secondary TSP processor (194) sends an LCM advice to the merchant (108). From block (1012), process (1000) proceeds to block (1014), which is performed by merchant (108). In block (1014), merchant processor (158) suspends or deletes the secondary token (176) stored in merchant memory (166).

From block (1014), process (1000) proceeds to block (1016), also performed by merchant processor (158). In block (1016), merchant processor (158) sends an LCM response to the DN account updater processor (156). From block (1016), process (1000) proceeds to block (1018), which is performed by secondary TSP (116). In block (1018), secondary TSP processor (194) receives the LCM response from the merchant processor (158). Also, from block (1014), process (1000) proceeds to block (1020), which is performed by the merchant (108). In block (1020), merchant processor (158) updates the cardholder's (104) customer profile (174), including his or her card account data (142), stored in the merchant memory (166). From block (1020), process (1000) proceeds to the end state (1010). In an example, process (1000) transitions from end state (1010) to start state (1002) iteratively for each of a plurality of issuer (120)-initiated change of state file (154) transmissions. In another example, a plurality of instances of process (1000) run in parallel for simultaneously processing a plurality of issuer (120)-initiated transmissions of change of state file(s) (154).

Figure 11:
FIG. 11 is a block diagram of a processing system for implementing the disclosed systems, methods, and software in the networked computing environment of FIG. 1, according to an embodiment of the disclosure.
Figure 11:
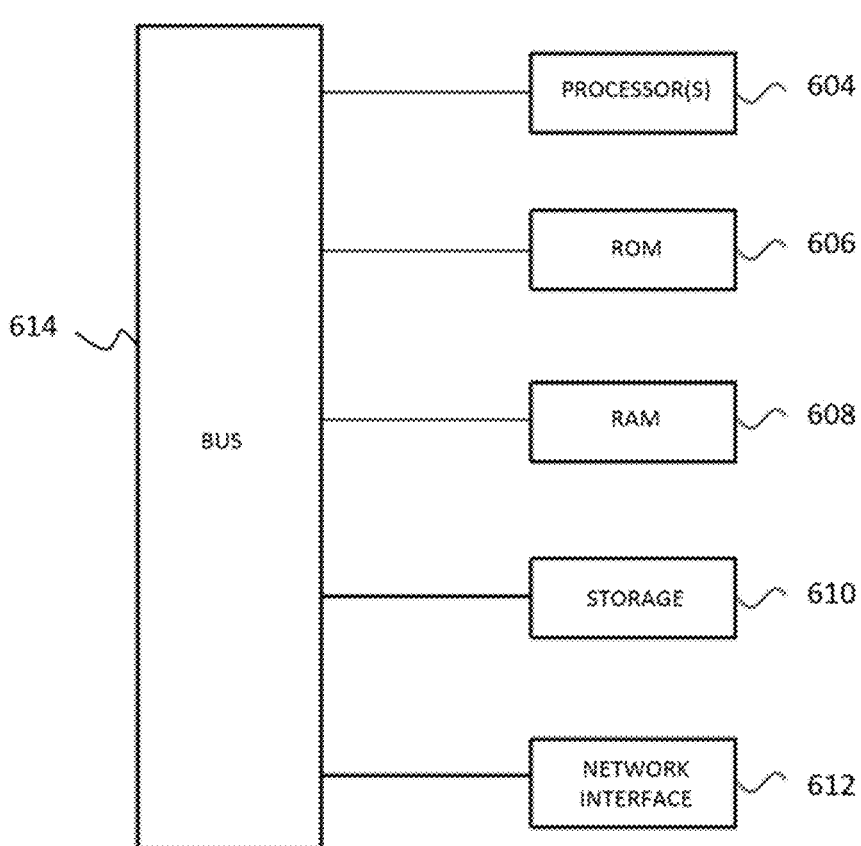

FIG. 11 is a block diagram of a processing system (603) for implementing the disclosed systems, methods, and software, according to an embodiment of the disclosure. The processing system (603) includes at least one processor (604), including, for example and without limitation, a central processing unit (CPU), which executes computer-executable instructions including embodiments of the system for performing the functions and methods described above. In some embodiments, the computer-executable instructions are locally stored and accessed from a non-transitory computer readable medium, such as storage (610), which may be a hard drive or flash drive. Read Only Memory (ROM) (606) includes computer executable instructions for initializing the processor (604), while the random-access memory (RAM) (608) is the main memory for loading and processing instructions executed by the processor (604). The network interface (612) may connect to a wired network or cellular network and to a local area network or wide area network, such as the Internet. Processor(s) (604), ROM (606), RAM (608), storage (610), and network interface (612) may communicate with one another and/or with the network via a bus (614).

In an embodiment, the at least one processor (604) includes a plurality of processors 604. In the embodiment, the plurality of processors (604) include the merchant processor(s) (158) and the secondary TSP processor(s) (194). Similarly, in the embodiment, storage (610) includes a plurality of memory devices. In the embodiment, the plurality of memory devices includes at least one instance of the non-transitory computer readable medium. In the embodiment, the plurality of memory devices include the merchant memory (166) and the secondary TSP memory (140). In the embodiment, the processors (158 and 194) and the memory devices (166 and 140) utilize respective network interfaces (612) to communicate with each over network (114) for cooperatively implementing, performing, and/or otherwise facilitating the above-described systems, methods, and processes, as shown and described above with reference to FIGS. 1-10.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A networked computing environment for securely processing online purchase transactions using tokens, the networked computing environment comprising:

a first computing system operated by a first token service provider (TSP) associated with a first payment network;

a second computing system operated by a second token service provider (TSP) associated with a second payment network that differs from the first payment network;

a third computing system operated on behalf of an online merchant;

a fourth computing system operated on behalf of a cardholder of a purchase card having an associated primary account number (PAN); and a fifth computing system operated on behalf of an issuer of the purchase card;

wherein the first, second, third, fourth, and fifth computing systems are networked together via one or more data networks;

wherein the first computing system comprises one or more processors and one or more non-transitory computer-readable mediums having program instructions stored thereon that, when executed by the one or more processors, cause the first computing system to:

receive, from the third computing system, a request for a first token for the purchase card that is available for use in place of the PAN when processing online purchase transactions involving the purchase card via the first payment network;

in response to the request for the first token, (i) generate the first token for the purchase card and (ii) transmit the first token to the third computing system;

receive, from the fifth computing system, a notification that an account associated with the purchase card has been suspended or closed; and in response to receiving the notification, transmit a first life cycle management (LCM) message to the third computing system that instructs the third computing system to suspend or delete the first token;

wherein the second computing system comprises one or more processors and one or more non-transitory computer-readable mediums having program instructions stored thereon that, when executed by the one or more processors, cause the second computing system to:

receive, from the third computing system, a request for a second token for the purchase card that is available for use in place of the PAN when processing online purchase transactions involving the purchase card via the second payment network;

in response to the request for the second token, (i) generate the second token for the purchase card and (ii) transmit the second token to the third computing system;

receive, from the third computing system, an authorization request for a given online purchase transaction that includes the second token;

detokenize the second token;

based on detokenizing the second token, generate a rebuilt authorization request for the given online purchase transaction;

transmit the rebuilt authorization request to the fifth computing system;

receive, from the third computing system, a second LCM message comprising a request to suspend or delete the second token; and in response to receiving the second LCM message, (i) process the second LCM message and (ii) transmit a third LCM message to the third computing system that instructs the third computing system to suspend or delete the second token;

wherein the third computing system comprises one or more processors and one or more non-transitory computer-readable mediums having program instructions stored thereon that, when executed by the one or more processors, cause the third computing system to:

obtain the first and second tokens for the purchase card by:

receiving, from the fourth computing system, card account data for the purchase card that is to be utilized by the online merchant for future online purchase transactions, wherein the card account data includes the PAN of the purchase card;

based on the received card account data, transmitting (i) the request for the first token to the first computing system and (ii) the request for the second token to the second computing system;

receiving the first token for the purchase card from the first computing system and storing the received first token in the one or more non-transitory computer-readable mediums of the third computing system; and receiving the second token for the purchase card from the second computing system and storing the received second token in the one or more non-transitory computer-readable mediums of the third computing system;

process the given online purchase transaction involving the purchase card by:

receiving a request to initiate the given online purchase transaction involving the purchase card;

based on network routing preferences, (i) determining that the given online purchase transaction is to be routed to the second payment network rather than the first payment network and (ii) selecting the second token to use for the given online purchase transaction; and transmitting, to the second computing system, the authorization request for the given online purchase transaction that includes the second token; and manage a lifecycle of the first and second tokens in a synchronized manner by:

receiving the first LCM message from the first computing system that was transmitted in response to the notification that the account associated with the purchase card has been suspended or closed and instructs the third computing system to suspend or delete the first token;

in response to receiving the first LCM message, suspending or deleting the first token for the purchase card;

in response to suspending or deleting the first token for the purchase card, transmitting the second LCM message comprising the request to suspend or delete the second token to the second computing system;

receiving the third LCM message from the second computing system that instructs the third computing system to suspend or delete the second token; and in response to receiving the third LCM message, suspending or deleting the second token for the purchase card;

wherein the fourth computing system comprises one or more processors and one or more non-transitory computer-readable mediums having program instructions stored thereon that, when executed by the one or more processors, cause the fourth computing system to:

receive, from the cardholder, the card account data of the purchase card; and transmit the card account data of the purchase card to the third computing system; and wherein the fifth computing system comprises one or more processors and one or more non-transitory computer-readable mediums having program instructions stored thereon that, when executed by the one or more processors, cause the fifth computing system to:

receive and process the rebuilt authorization request that is transmitted by the second computing system;

suspend or close the cardholder's account associated with the purchase card; and transmit, to the first computing system, the notification that the account associated with the purchase card has been suspended or closed.

2. The networked computing environment of claim 1, wherein the first token comprises a primary network-based token associated with a front-of-card brand of the purchase card and the second token comprises a secondary network-based token associated with a back-of-card brand of the purchase card.

3. The networked computing environment of claim 1, wherein the purchase card is a debit card.

4. The networked computing environment of claim 1, wherein the first token for the purchase card and the second token for the purchase card are stored as co-existent, side-by-side tokens in the one or more non-transitory computer-readable mediums of the third computing system.

5. The networked computing environment of claim 1, wherein the purchase card comprises a multi-token enabled purchase card.

6. The networked computing environment of claim 1, wherein the program instructions of the fifth computing system that, when executed by the one or more processors, cause the fifth computing system to transmit, to the first computing system, the notification that the account associated with the purchase card has been suspended or closed comprise program instructions that, when executed by the one or more processors, cause the fifth computing system to: transmit the notification that the account associated with the purchase card has been suspended or closed to the first computing system via the first payment network.

7. The networked computing environment of claim 1, wherein the one or more non-transitory computer-readable mediums of the third computing system have program instructions stored thereon that, when executed by the one or more processors, cause the third computing system to: after suspending or deleting the first token for the purchase card, transmit, to the first computing system, a fourth LCM message that is responsive to the first LCM message; and wherein the one or more non-transitory computer-readable mediums of the first computing system have program instructions stored thereon that, when executed by the one or more processors, cause the first computing system to: receive the fourth LCM message from the third computing system.

8. The networked computing environment of claim 1, wherein the one or more non-transitory computer-readable mediums of the third computing system have program instructions stored thereon that, when executed by the one or more processors, cause the third computing system to: delete or update the card account data for the purchase card.

9. The networked computing environment of claim 1, wherein the network routing preferences indicate a preference for routing online purchase transactions to the second payment network rather than the first payment network.

\* \* \* \* \*